US012425387B2

(12) United States Patent
Tilmon et al.

(10) Patent No.: US 12,425,387 B2
(45) Date of Patent: Sep. 23, 2025

(54) SYSTEMS AND METHODS FOR MACHINE-READABLE CODE-BASED AUTHENTICATION

(71) Applicant: Capital One Services, LLC, McLean, VA (US)

(72) Inventors: John Tilmon, McLean, VA (US); Kyle G. McKenna, McLean, VA (US); Nicholas Pulaski, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 140 days.

(21) Appl. No.: 18/503,871

(22) Filed: Nov. 7, 2023

(65) Prior Publication Data

US 2025/0150446 A1 May 8, 2025

(51) Int. Cl.
*H04L 9/40* (2022.01)
*H04W 4/14* (2009.01)

(52) U.S. Cl.
CPC ........... *H04L 63/0815* (2013.01); *H04W 4/14* (2013.01)

(58) Field of Classification Search
CPC .............................. H04L 63/0815; H04W 4/14
USPC ............................................................ 726/6
See application file for complete search history.

(56) References Cited

U.S. PATENT DOCUMENTS

| 2019/0222424 | A1* | 7/2019 | Lindemann | ........... H04L 9/3297 |
| 2021/0385224 | A1* | 12/2021 | Singh | ................... H04L 63/0853 |
| 2022/0078184 | A1* | 3/2022 | Traynor | .............. H04W 12/069 |

* cited by examiner

*Primary Examiner* — Meng Vang
(74) *Attorney, Agent, or Firm* — Foley & Lardner LLP

(57) ABSTRACT

Methods and systems for machine-readable code-based access in absence of a physical authentication token. In some embodiments, the system receives, from a mobile device, a text message, in which the mobile device is operating on a mobile network and associated with a user digital identifier relating to the mobile network, and the text message indicates a first request for access in absence of the physical authentication token. The system determines whether to authenticate the first request based on mobile device information relating to the mobile device. In response to authenticating the first request, the system provides a first machine-readable code associated with a user account; and receives a second request from a third party for accessing the user account. The system assesses second information based on a prediction model and first information associated with the first machine-readable code; and in response to a satisfactory assessment result, authenticates the second request.

20 Claims, 18 Drawing Sheets

200

---

Receive, from a mobile device, a first text message addressed to a recipient digital identifier, wherein the mobile device is operating on a mobile network and associated with a user digital identifier relating to the mobile network, and wherein the first text message indicates a request for account access in absence of the physical authentication token
202

↓

Generate, for transmission to the mobile device, a second text message including a link to a webpage for account access in absence of the physical authentication token
204

↓

In response to receiving an indication of accessing the link from the mobile device, obtain mobile device information associated with the mobile device, wherein the mobile device information relates to the mobile network and associated with the user digital identifier
206

↓

In response to determining an existence of the user account, determine, based on the mobile device information, whether to authenticate the request
208

↓

In response to determining that the request is authenticated, generate a machine-readable code associated with the user account
210

↓

Transmit the machine-readable code to the mobile device for display, wherein the machine-readable code is configured to allow a third party to access the user account by scanning the machine-readable code
212

*FIG. 2*

SYSTEMS AND METHODS FOR MACHINE-READABLE CODE-BASED AUTHENTICATION

SUMMARY

Systems and methods are described herein for text messaging-based self-service authentication of a request for account access in the absence of a physical authentication token. Conventional systems may allow for a third party acquiring account and/or identification information from a user and transmitting such account and/or identification information to a system to proceed with the authentication in the absence of a physical authentication token. Transferring sensitive information or documents to the third party may expose such sensitive information or documents to security breaches or data leaks. To mitigate security risks, data may need to be encrypted during transmission to and from the third-party system, which can be technically complex and resource intensive. The third-party system may also introduce latency in the authentication or transaction process, which can affect the overall performance of the transaction.

How to improve the flow of data to minimize delays is a technical challenge for conventional systems. Access to such sensitive information or documents by the third party may trigger regulatory requirements for security and compliance with respect to personal data, transaction audits, etc., depending on one or more factors including industry, location, etc. Managing and storing this data for regulatory compliance purposes can be technically challenging for the third party. Considering that the third party is not in the position to make a decision regarding the authentication of the account, these and other associated technical challenges are burdensome and also unnecessary/avoidable for the third party. Additionally or alternatively, on the system side, for the system to work with different third parties (at an initial implementation stage and/or a subsequent system maintenance or upgrade stage) in similar situations, the system may need to ensure that data formats and protocols used by various third parties are compatible with the system, which can be technically challenging. Data may need to be translated and mapped correctly to ensure a smooth authentication and/or transaction.

To overcome these technical deficiencies, in some aspects, methods and systems disclosed herein allow text messaging-based self-service authentication in the absence of a physical authentication token. A first aspect of the present disclosure relates to self-service authentication accomplished by allowing a user to directly communicate, via a mobile device, with the system that utilizes mobile device information (e.g., Mobile Network Operator (MNO) information) relating to the mobile device as authentication credentials. A second aspect of the present disclosure relates to allowing the system to select, from tiered authentication protocols, an applicable authentication protocol based on a result from a check based on the mobile device information. In some embodiments, the system may allow some steps in the authentication process to be triggered by events other than an explicit user instruction and/or proceed in parallel, thereby expediting the authentication process. A third aspect of the present disclosure relates to employing a temporary machine-readable code, instead of a permanent account number, as an access token.

The technical solutions disclosed herein provide practical benefits including at least (1) obviating the need for the user to provide personal account and/or identification information to a third party and, in some situations, to the system for authentication purposes, (2) by utilizing the mobile device information associated with the mobile device and not personal account/identification information directly provided by the user, reducing the risk of fabricating or illegal use of personal/account information by an unauthorized user, (3) by employing tiered authentication protocols, simplifying/expediting the authentication process and reducing bandwidth consumption involved in data transmission and/or processing, and (4) improving account security in a transaction regarding an account in the absence of a physical authentication token of the account by employing a temporary machine-readable code, instead of a permanent account number, as an access token.

Some aspects of the present disclosure relate to a system for text messaging-based self-service authentication in absence of a physical authentication token. In some embodiments, the system receives, from a mobile device, a first text message addressed to a recipient digital identifier associated with an account type. The mobile device is operating on a mobile network and associated with a user digital identifier relating to the mobile network. The first text message indicates a request for account access in absence of the physical authentication token. Upon receipt of the first text message, the system generates, for transmission to the mobile device, a second text message including a link to a webpage for account access in absence of the physical authentication token. In response to receiving an indication of accessing the link from the mobile device, the system determines, based on the user digital identifier, whether there exists a user account of the account type. In response to determining an existence of the user account, the system retrieves mobile device information relating to the mobile network and associated with the user digital identifier, and determines, based on the mobile device information, whether to authenticate the request. In response to determining that the request is authenticated, the system generates a temporary machine-readable code associated with the user account, wherein the temporary machine-readable code is valid for a specified period of time, and transmits the temporary machine-readable code to the mobile device for display within the webpage on the mobile device, wherein the temporary machine-readable code is configured to allow a third party to access the user account by scanning, within the specified period, the temporary machine-readable code.

Some aspects of the present disclosure relate to a system for managing text messaging-based authentication in absence of a physical authentication token. In some embodiments, the system receives, from a mobile device, a first text message addressed to a recipient digital identifier. The mobile device is operating on a mobile network and associated with a user digital identifier relating to the mobile network. The first text message indicates a request for access in absence of the physical authentication token. Upon receipt of the first text message, the system performs an account search based on the user digital identifier. In response to determining an existence of a user account associated with the user digital identifier, the system retrieves mobile device information relating to the mobile network and associated with the user digital identifier, performs an assessment based on the mobile device information, and selects, from a plurality of candidate authentication protocols, an authentication protocol based on the assessment of the mobile device information. According to a first candidate authentication protocol of the plurality of candidate authentication protocols, in response to determining, based on the assessment, that an authentication condition is satisfied, the system determines that the request is authenticated without requesting further information regarding the user account. According to a second candidate authentication protocol of the plurality of candidate authentication protocols, in response to determining, based on the assessment, that the authentication condition is not satisfied, the system requests additional authentication information regarding the user account. The system manages, based on the authentication protocol, the request for access in absence of the physical authentication token.

Some aspects of the present disclosure relate to a system for machine-readable code-based access in absence of a physical authentication token. In some embodiments, the system receives, from a mobile device, a text message addressed to a recipient digital identifier. The mobile device is operating on a mobile network and associated with a user digital identifier relating to the mobile network. The text message indicates a first request for access in absence of the physical authentication token. Upon receipt of the text message, the system determines whether there exists a user account based on the user digital identifier. In response to determining an existence of the user account based on the user digital identifier, the system retrieves mobile device information relating to the mobile network and associated with the user digital identifier; and determines whether to authenticate the first request based on the mobile device information. In response to determining that the first request is authenticated, the system generates a first machine-readable code associated with the user account. The first machine-readable code is valid for a specified period. The system transmits, to the mobile device, the first machine-readable code for display on the mobile device and receives a second request from a third party for accessing the user account that was initiated by the third party scanning a second machine-readable code using a third party electronic device. The system assesses second information associated with the second machine-readable code based on a prediction model and first information associated with the first machine-readable code. In response to determining that the second information corresponds to the first information and the third party scanned the second machine-readable code within the specified period of the first machine-readable code, the system identifies the user account associated with the first machine-readable code; and authenticates the second request for the third party to access the user account.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part, or the entirety (i.e., the entire portion), of a given item (e.g., data) unless the context clearly dictates otherwise.

BRIEF DESCRIPTION OF THE DRAWINGS

FIG. 2 illustrates an exemplary process for text messaging-based self-service authentication in absence of a physical authentication token, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
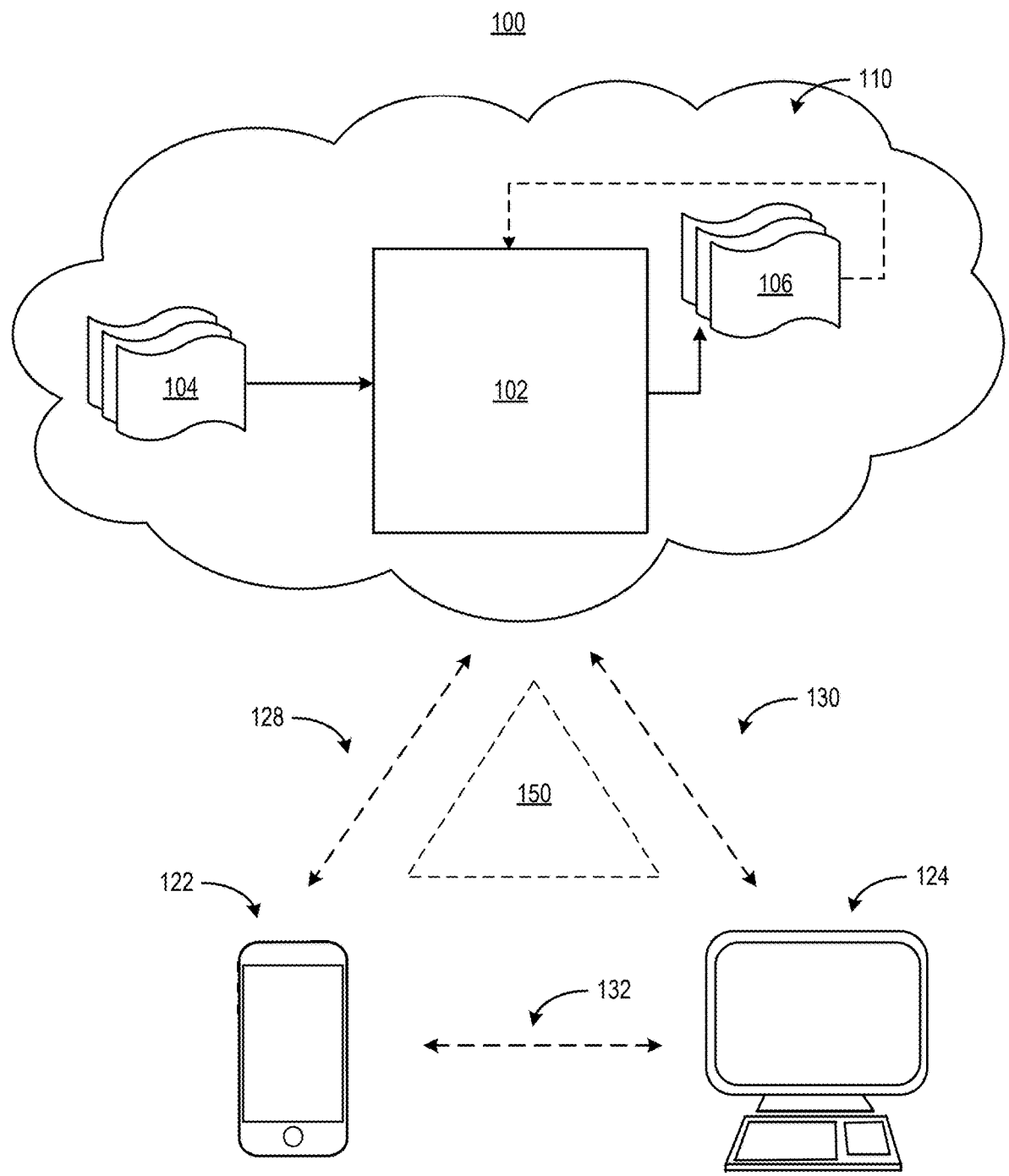
FIG. 1 shows illustrative components for performing outlier detection, in accordance with one or more embodiments.

FIG. 1 shows illustrative components for performing text messaging-based self-service authentication, in accordance with one or more embodiments. As shown in FIG. 1, system 100 may include mobile device 122 and user terminal 124. While shown as a smartphone and personal computer, respectively, in FIG. 1, it should be noted that mobile device 122 and user terminal 124 may be any computing device, including, but not limited to, a laptop computer, a tablet computer, a handheld computer, and other computer equipment (e.g., a server), including "smart," wireless, wearable, and/or mobile devices. FIG. 1 also includes cloud components 110. Cloud components 110 may alternatively be any computing device as described above, and may include any type of mobile terminal, fixed terminal, or other device. For example, cloud components 110 may be implemented as a cloud computing system, and may feature one or more component devices. It should also be noted that system 100 is not limited to three devices. Users may, for instance, utilize one or more devices to interact with one another, one or more servers, or other components of system 100. It should be noted, that, while one or more operations are described herein as being performed by particular components of system 100, these operations may, in some embodiments, be performed by other components of system 100. As an example, while one or more operations are described herein as being performed by components of mobile device 122, these operations may, in some embodiments, be performed by components of cloud components 110. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

With respect to the components of mobile device 122, user terminal 124, and cloud components 110, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 1, both mobile device 122 and user terminal 124 include a display upon which to display data (e.g., notifications).

As referred to herein, a "user interface" may comprise a human-computer interaction and communication in a device, and may include display screens, keyboards, a mouse, and the appearance of a desktop. For example, a user interface may comprise a way a user interacts with an application or a website. A notification may comprise any content.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

Additionally, as mobile device 122 and user terminal 124 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 100 may run an application (or another suitable program). The application may cause the processors and/or control circuitry to perform operations related to text messaging-based self-service authentication, generating dynamic replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random-access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

For example, each of these devices may comprise a knowledge database that represents data and/or metadata on previously developed models (e.g., when the respective models were generated or updated, parameters of such models, the performance of the respective models, etc.). The knowledge database may include archived information related to potential model uses, maintenance, and/or updates. Additionally, or alternatively, the knowledge database may include archived information related to training data used in previous model training, maintenance, and/or updates. For example, this information may include one or more algorithms and relevant parameters of the algorithm(s) generated in analyzing authentication information in text messaging-based self-service authentication.

FIG. 1 also includes communication paths 128, 130, and 132. Communication paths 128, 130, and 132 may include the Internet, a mobile phone network, a mobile voice or data network (e.g., a 5G or Long Term Evolution (LTE) network), a cable network, a public switched telephone network, a short-range wireless communication network (e.g., Bluetooth or Near Field Communications (NFC)), or other types of communications networks or combinations of communications networks. Communication paths 128, 130, and 132 may separately or together include one or more communications paths, such as a satellite path, a fiber-optic path, a cable path, a path that supports Internet communications (e.g., Internet Protocol television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 110 may include model 102, which may be one or more machine learning models, artificial intelligence models, etc. (which may be referred to collectively herein as "models"). Model 102 may take inputs 104 and provide outputs 106. The inputs may include multiple data sets, such as a training data set and a test data set. Each of the plurality of data sets (e.g., inputs 104) may include an event data set related to an event. In some embodiments, outputs 106 may be fed back to model 102 as input to train model 102 (e.g., alone or in conjunction with user indications of the accuracy of outputs 106, labels associated with the inputs, or with other reference feedback information).

In some embodiments, system 100 may use model 102 for text messaging-based self-service authentication. Examples of model 102 may be found elsewhere in the present disclosure in, for example, FIGS. 2-4 and relevant descriptions thereof. For example, model 102 may determine whether to authenticate a request based on mobile device information associated with a mobile device from which the request is submitted. As another example, model 102 may select, from tiered authentication protocols, an applicable authentication protocol. As a further example, model 102 may generate a temporary machine-readable code to be used as an access token for transaction with a third party. Model 102 may use supervised or unsupervised learning and may train itself to simplify and/or speed up data processing while also enhancing model accuracy. In some embodiments, model 102 may train itself to generate better feature transformations at one or more nodes. A feature transformation may comprise a function that transforms features from one representation to another. In some embodiments, model 102 may train itself to generate better feature extraction at one or more nodes. Feature extraction is the process of extracting features from a data set to identify useful information. In some embodiments, model 102 may train itself to perform better exploratory data analysis at one or more nodes.

In a variety of embodiments, model 102 may update its configurations (e.g., weights, biases, or other parameters) based on the assessment of its prediction (e.g., outputs 106), reference feedback information (e.g., user indication of accuracy, reference labels, or other information), and/or availability of additional training data. In a variety of embodiments, system 100 may adjust parameters of model 102 to reconcile differences between the model's prediction and reference feedback. In this way, for example, system 100 may train model 102 to generate better predictions. In some embodiments, model 102 may be self-learning and trained, rather than explicitly programmed, and can perform significantly better in certain areas of problem-solving, as compared to traditional computer programs.

In some embodiments, the model (e.g., model 102) may automatically perform actions based on outputs 106. In some embodiments, the model (e.g., model 102) may not perform any actions. System 100 may use the output of the model (e.g., model 102) to generate a recommendation, notification, etc. More descriptions of text messaging-based self-service authentication using model 102 may be found elsewhere in the present disclosure at, for example, FIGS. 2-4 and relevant descriptions thereof.

System 100 also includes Application Programming Interface (API) layer 150. API layer 150 may allow the system to generate summaries across different devices. In some embodiments, API layer 150 may be implemented on mobile device 122 or user terminal 124. Alternatively, or additionally, API layer 150 may reside on one or more of cloud components 110. API layer 150 (which may be a Representational state transfer (REST) or web services API layer) may provide a decoupled interface to data and/or functionality of one or more applications. API layer 150 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, PUP, and JavaScript. Simple Object Access Protocol (SOAP) Web services have traditionally been adopted in the enterprise for publishing internal services, as well as for exchanging information with partners in B2B transactions.

API layer 150 may use various architectural arrangements. For example, system 100 may be partially based on API layer 150, such that there is strong adoption of SOAP and RESTful web services, using resources like Service Repository and Developer Portal, but with low governance, standardization, and separation of concerns. Alternatively, system 100 may be fully based on API layer 150, such that separation of concerns between layers like API layer 150, services, and applications are in place.

In some embodiments, the system architecture may use a microservice approach. Such systems may use two types of layers: front-end layer and back-end layer, where microservices reside. In this kind of architecture, the role of the API layer 150 may provide integration between the front-end layer and back-end layer. In such cases, API layer 150 may use RESTful APIs (exposition to front-end or even communication between microservices). API layer 150 may use Advanced Message Queuing Protocol (AMQP) (e.g., Kafka, RabbitMQ, etc.). API layer 150 may use incipient usage of new communications protocols, such as gRPC, Thrift, etc.

In some embodiments, the system architecture may use an open API approach. In such cases, API layer 150 may use commercial or open source API platforms and their modules. API layer 150 may use a developer portal. API layer 150 may use strong security constraints applying web application firewall (WAF) and distributed denial of service (DDoS) protections, and API layer 150 may use RESTful APIs as standard for external integration.

FIG. 2 illustrates an exemplary process for text messaging-based self-service authentication in absence of a physical authentication token, in accordance with one or more embodiments. For example, process 200 may represent steps taken by one or more components of system 100 as shown in FIG. 1, or by one or more device external to system 100. Merely by way of example, a third-party device may train, maintain, and/or update a model for analyzing information for authentication, including mobile device information, and transmit a trained or updated model to system 100, and system 100 may store the trained or updated minority expert model as part of, for example, model 102. As another example, system 100 may train, maintain, and/or update a model for analyzing information for authentication and store the trained or updated model as part of, for example, model 102.

At step 202, process 200 may receive, from a mobile device, a first text message addressed to a recipient digital identifier. The first text message may indicate a request for account access in absence of the physical authentication token. The mobile device may be operating on a mobile network and associated with a user digital identifier relating to the mobile network. The user digital identifier may be a mobile phone number.

System 100 may designate the recipient digital identifier for a third party. Merely by way of example, system 100 may be a credit card issuer (e.g., a bank) and designate recipient digital identifiers for various merchants (e.g., different department stores, franchise stores, company-owned retail stores, respectively). The account associated with the authentication request may belong to a same account type as the recipient digital identifier. The recipient digital identifier may include a Short Message Service (SMS) short code, a shortened telephone number, used primarily for sending and receiving SMS messages and multimedia messages (MMS) on mobile devices. In some embodiments, the recipient digital identifier may include a machine-readable code (e.g., a Quick Response (QR) code). By employing the designated recipient digital identifier, system 100 may conveniently recognize which type of account (e.g., a department store credit card associated with the same third party as the recipient digital identifier) an authentication request from the user is likely to pertain to, thereby improving the efficiency and/or accuracy of the authentication process. System 100 may post a recipient digital identifier on its website or in its mobile application, e.g., in the Customer Services section, in the Frequently Asked Questions section, via a Live Chat function (e.g., by a chat robot in response to a user inquiry), via phone or text messaging services (e.g., as part of customer services), or the like. Such recipient digital identifier may be posted within the premises of a third party's establishment (e.g., on a wall near a cashier of a store). The recipient digital identifier may be directed to a recipient to whom a user may send a text message to initiate an authentication request for account access in the absence of a physical authentication token. The recipient digital identifier may be provided in the form of a number or a machine-readable code. Merely by way of example, the user may scan the machine-readable code using the mobile device to retrieve a number to which the user may send a text message to initiate an authentication request.

At step 204, process 200 may generate, for transmission to the mobile device, a second text message including a link to a webpage for account access in absence of the physical authentication token to invite the user to interact with system 100 to proceed with authentication relating to the account access. Upon receiving the first text message from the mobile device, system 100 may generate the second text for providing the user with the link to the webpage where the system-user interaction may occur for authenticating the user request for account access in the absence of the physical authentication token. Merely by way of example, the second text message may include a short link to the webpage. In some embodiments, system 100 may include a link shortener (e.g., Uniform Resource Locator (URL) shortener) to generate a short link for the webpage to be included in the second text message. In some embodiments, system 100 may store many short links (e.g., short links relating to different stores) in a storage device and retrieve the applicable short link from the storage device in response to receipt of the first text message.

In some embodiments, system 100 may allow a user to access the webpage to interact with system 100 with respect to the authentication process, using the link system 100 sends to the mobile device. This may allow a user to proceed with the authentication process in absence of a physical authentication token. Additionally or alternatively, this may allow the user to proceed with the authentication process without accessing a mobile application of system 100, whose access may require login credentials. Instead, system 100 may allow the user to proceed with the authentication process based on mobile device information and/or additional authentication information. In some embodiments, system 100 may provide an option of accessing a page within the mobile application to proceed with the authentication process. For brevity, such a page may also be referred to as a webpage in the present disclosure.

At step 206, process 200 may, in response to receiving an indication of accessing the link from the mobile device, obtain mobile device information associated with the mobile device. The mobile device information may relate to the mobile network through which the mobile device is operating and be associated with the user digital identifier. For example, system 100 may retrieve the mobile device information from the mobile network or a vendor that provides such information, based on the user digital identifier. The mobile network may be a Mobile Network Operator (MNO) or a Mobile Virtual Network Operator (MVNO). The mobile device information may include an operation duration during which the mobile device has been operating on the mobile network, an activity history of activities associated with the mobile device, roaming status, a mobile device location when the mobile device transmits the request, or subscriber information, or the like, or a combination.

Retrieval of mobile device information from the mobile network or vendor may take time and/or incur costs. Accordingly, in some embodiments, system 100 may perform one or more prerequisite checks before the retrieval. For example, system 100 may allow the user to indicate an intention to perform the authentication without a physical authentication token (e.g., a credit card) by sending, from a mobile device, a text message to a designated recipient digital identifier as described in step 202, and detecting that the user has clicked the link to the webpage system 100 transmits to the mobile device, as described in step 204, as a confirmation of the user intention. System 100, in response to receiving an indication of accessing the link from the mobile device, may also look up the user digital identifier of the mobile device system 100 to determine whether there is an account associated with the user digital identifier as part of the prerequisite check.

At step 208, process 200 may determine, based on the mobile device information, whether to authenticate the request. The operation may also be referred to as an MNO check, regardless of whether the mobile device is operating on an MNO or an MVNO. As used herein, an MNO check, also referred to as MNO fraud check, may refer to an assessment based on mobile device information, e.g., MNO information. For example, system 100 may access the mobile device information by performing one or more of comparing the operation duration with a duration threshold, comparing the mobile device location with a location of the third party, comprising the subscriber information with information of a user associated with the user account, or identifying, based on the mobile device information, whether a fraudulent behavior is associated with the mobile device, or the like, or a combination thereof. Based on the assessment, system 100 may determine whether to authenticate the request. For example, system 100 may determine a risk score based on the assessment, and compare the risk score with a risk score threshold. Merely by way of example, in response to determining that the risk score is below the risk score threshold, system 100 may determine to authenticate the request based on the mobile device information; in response to determining that the risk score exceeds the risk score threshold, system 100 may determine not to authenticate the request based on the mobile device information.

As another example, system 100 may extract, from the mobile device information, a feature vector representing one or more features that are indicative of a risk of fraudulent behavior associated with the mobile device or the user digital identifier, input the feature vector into a machine learning model that is trained to provide a characterization of the mobile device information, and determine whether to authenticate the request based on the characterization of the mobile device information. In some embodiments, the characterization of the mobile device information may include a risk score; system 100 may determine whether to authenticate the request by comparing the risk score with a risk score threshold. Merely by way of example, in response to determining that the risk score is below the risk score threshold, system 100 may determine to authenticate the request based on the mobile device information; in response to determining that the risk score exceeds the risk score threshold, system 100 may determine not to authenticate the request based on the mobile device information.

If system 100 determines to authenticate the request based on the mobile device information, system 100 may proceed with a requested transaction via a user account relating to the authentication, thereby excluding the involvement of the third party in the authentication. If the system determines not to authenticate the request based on the mobile device information, the system may invite the user to provide additional authentication information in order for the system to authenticate the request.

At step 210, process 200 may, in response to determining that the request is authenticated, generate a machine-readable code associated with the user account. The machine-readable code may include a barcode, a QR code, or the like. The machine-readable code may embed multifaceted information. For example, the machine-readable code may include a credit limit for a transaction or transactions with a time limit (e.g., 1 day, 1 hour, etc.), account information, merchant identifier (the identity of the third party with which a transaction using the machine-readable code may proceed), transaction location (e.g., the location of the third party where the user initiated the authentication request), timestamp (e.g., the time point when the machine-readable code is generated), currency (e.g., the currency in which the transaction is being conducted), or the like, or a combination thereof.

The machine-readable code may be temporary and valid for a specified period of time, e.g., 5 minutes, 10 minutes, etc., from a reference time point. Examples of the reference time point may be the time when the machine-readable code is generated, the time when the machine-readable code is sent to the mobile device, etc. Upon expiry of the time period, the machine-readable code may become invalid so that no transaction may occur with the user account based on the machine-readable code.

At step 212, process 200 may transmit the machine-readable code to the mobile device. For example, the machine-readable code may be displayed within the webpage on the mobile device. The machine-readable code may be configured to allow a third party to access the user account by scanning the machine-readable code (e.g., within the specified period when the machine-readable code is valid).

In some embodiments, system 100 may generate a notification to the user based on the authentication decision. For example, in response to determining not to authenticate the request based on the mobile device information, system 100 may generate, for transmission to the mobile device, a first notification requesting first additional authentication information. Examples of the first additional authentication information may include social security number, birthday, driver's license number, an image of a government issued identification document, a proof of residence, or the like, or a combination thereof. The first additional authentication information may be submitted in the form of text, an image, or the like, or a combination thereof. System 100 may transmit the first notification via a third text message to the mobile device, or cause the first notification to be displayed in the webpage on the mobile device. The first notification may include a prompt configured to allow a submission of the first additional authentication information. System 100 may receive, from the mobile device, the first additional authentication information the user has submitted. System 100 may receive information transmitted using a secure protocol. For example, the information corresponding to the first additional authentication information may be encrypted or compressed for transmission from the mobile device to system 100, and system 100 may decrypt or decompress the information to retrieve the first additional authentication information. System 100 may determine whether to authenticate the request based on the first additional authentication information. In response to determining that the request is authenticated based on the first additional authentication information, process 200 may proceed to 210 and 212 as described.

The above-described steps of process 200 are presented for purposes of illustration and not of limitation. Process 200 may include additional steps or omit one or more of the steps 202-212 described above. For example, in connection with step 206, system 100 may determine that no user account associated with the user digital identifier exists in system 100. In response to failing to determine the existence of the user account, system 100 may generate, for transmission to the mobile device, a second notification requesting second additional authentication information. The second notification and the second additional authentication information may be identical or similar to the first notification and the first additional authentication information described above. Examples of the second additional authentication information may include a second user digital identifier that is different from the user digital identifier associated with the mobile device, such as social security number, birthday, driver's license number, an image of a government issued identification document, a proof of residence, or the like, or a combination thereof. The second additional authentication information may be submitted in the form of text, an image, or the like, or a combination thereof. System 100 may transmit the second notification via a fourth text message to the mobile device, or cause the second notification to be displayed in the webpage on the mobile device. The second notification may include a prompt configured to allow a submission of the second additional authentication information. System 100 may receive, from the mobile device, the second additional authentication information the user has submitted. System 100 may receive information transmitted using a secure protocol. For example, the information corresponding to the second additional authentication information may be encrypted or compressed for transmission from the mobile device to system 100, and system 100 may decrypt or decompress the information to retrieve the second additional authentication information. System 100 may perform another account lookup using the second additional authentication information (e.g., using the second user digital identifier) and/or determine whether to authenticate the request based on the second additional authentication information. In response to determining that the request is authenticated based on the second additional authentication information, process 200 may proceed to 210 and 212 as described.

As another example, in connection with step 206, system 100 may determine that multiple user accounts associated with the user digital identifier exist in system 100. System 100 may generate, for transmitting to the mobile device, a third notification inviting a selection from the multiple user accounts to proceed with respect to the request. System 100 may transmit the third notification via a fifth text message to the mobile device or cause the third notification to be displayed in the webpage on the mobile device. System 100 may receive a user selection of the account with respect to which the authentication process needs to proceed further and proceed accordingly. In some embodiments, system 100 may automatically select or identify, without user input, from the multiple user accounts, the user account that is associated with the third party.

In some embodiments, system 100 may proceed with some operations of process 200 before the user inputs any personal or account information, thereby expediting and/or simplifying the authentication process. For example, system 100 may perform account lookup in response to receiving an indication of the user accessing the link to the webpage from the mobile device at 206 before the user provides personal or account information, thereby simplifying/expediting the account lookup process. As another example, in response to receiving an indication of the user accessing the link to the webpage from the mobile device (indicating a user intention to proceed with the authentication process) at 206 and/or locating a user account associated with the third party, system 100 may proceed with retrieving the MNO information based on the user digital identifier at 206 and performing the MNO check at 208 without a user instruction or user input to provide personal or account information, thereby simplifying/expediting the authentication process. In some circumstances, system 100 may authenticate the user request based on a satisfactory MNO check, obviating the need for the user to provide any personal or account information, thereby further simplifying/expediting the authentication process.

Figure 3:
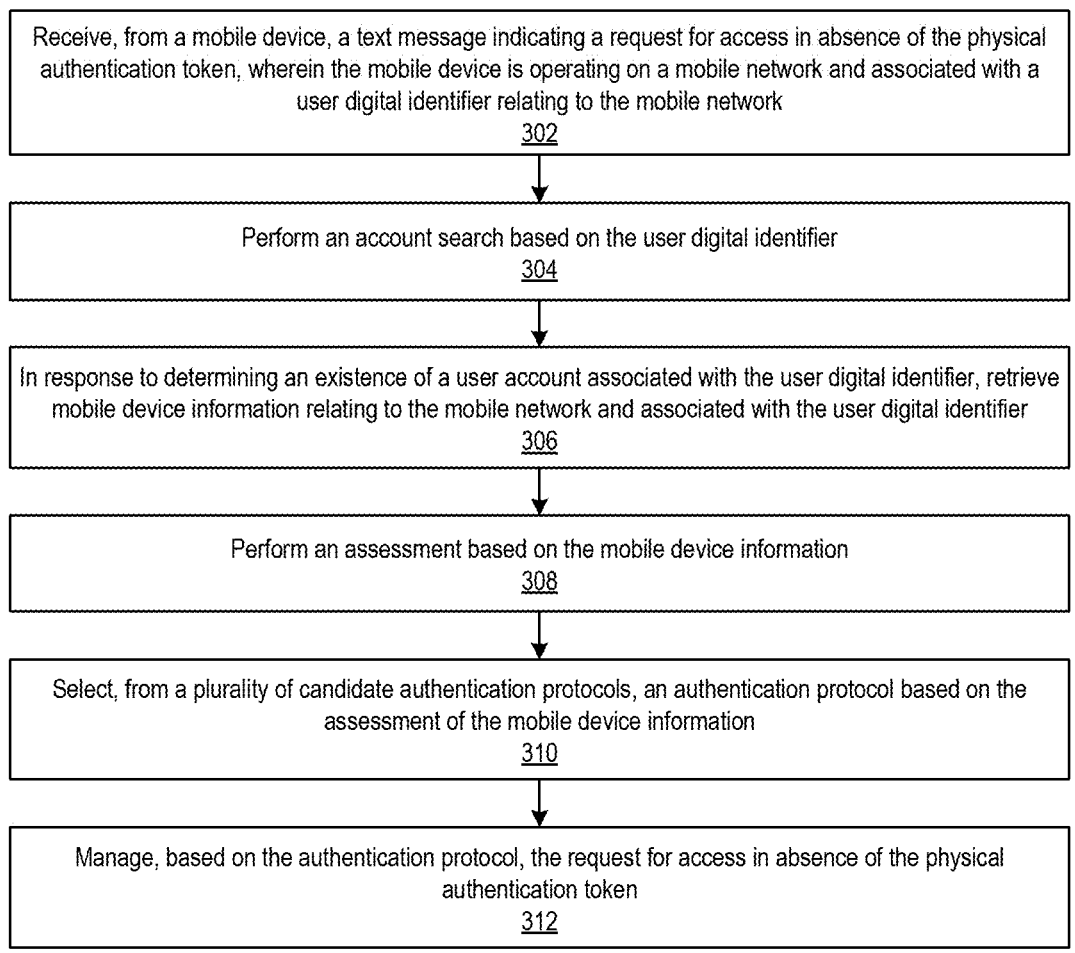
FIG. 3 illustrates an exemplary process for text messaging-based self-service authentication in absence of a physical authentication token, in accordance with one or more embodiments.

FIG. 3 illustrates an exemplary process for text messaging-based self-service authentication in absence of a physical authentication token, in accordance with one or more embodiments. For example, process 300 may represent steps taken by one or more components of system 100 as shown in FIG. 1, or by one or more devices external to system 100. Merely by way of example, a third-party device may train, maintain, and/or update a model for analyzing information for authentication, including mobile device information, and transmit a trained or updated model to system 100, and system 100 may store the trained or updated minority expert model as part of, for example, model 102. As another example, system 100 may train, maintain, and/or update a model for analyzing information for authentication and store the trained or updated model as part of, for example, model 102.

At step 302, process 300 may receive, from a mobile device, a text message indicating a request for access in absence of the physical authentication token. The mobile device may be operating on a mobile network and may be associated with a user digital identifier relating to the mobile network. The text message may be addressed to a recipient digital identifier that system 100 designates for a third party. The account associated with the authentication request may belong to a same account type as the recipient digital identifier. More description regarding the recipient digital identifier, including how a user can find the recipient digital identifier, may be found elsewhere in the present disclosure (see, e.g., relevant description in connection with process 200, e.g., step 202 of process 200), and is not repeated here. By employing the designated recipient digital identifier, system 100 may conveniently recognize which type of account (e.g., a department store credit card associated with the same third party as the recipient digital identifier) an authentication request from the user is likely to pertain to, thereby improving the efficiency and/or accuracy of the authentication process.

At step 304, process 300 may perform an account search (also referred to as account lookup) based on the user digital identifier. At step 306, process 300 may retrieve, in response to determining an existence of a user account associated with the user digital identifier, mobile device information relating to the mobile network and associated with the user digital identifier. More description regarding the mobile device information may be found elsewhere in the present disclosure (see, e.g., relevant description in connection with process 200, e.g., step 206 of process 200) and is not repeated here.

Retrieval of mobile device information from the mobile network or vendor may take time and/or incur costs. Accordingly, in some embodiments, system 100 may perform one or more prerequisite checks before the retrieval. For example, system 100 may allow the user to indicate an intention to perform the authentication without a physical authentication token (e.g., a credit card) by sending, from a mobile device, a text message to a designated recipient digital identifier as described in step 302. In some embodiments, system 100 may generate and transmit, to the mobile device, a second text message including a link to a webpage for access in absence of the physical authentication token and detect that the user has clicked the link to the webpage system 100 transmits to the mobile device as a confirmation of the user intention. Merely by way of example, system 100 may send the second text message upon receipt of the first text message from the mobile device at step 302, before system 100 performs the account lookup at step 304. More description regarding the second text message may be found elsewhere in the present disclosure (see, e.g., relevant description in connection with process 200, e.g., step 204 of process 200) and is not repeated here. In some embodiments, in response to failing to determine the existence of the user account at step 304, system 100 may refrain from retrieving mobile device information relating to the mobile network and associated with the user digital identifier.

At step 308, process 300 may perform an assessment based on the mobile device information. More description regarding the mobile device information may be found elsewhere in the present disclosure (see, e.g., relevant description in connection with process 200, e.g., step 208 of process 200) and is not repeated here.

At step 310, process 300 may select, from a plurality of candidate authentication protocols, an authentication protocol based on the assessment of the mobile device information. By employing tiered authentication protocols, system 100 may simplify/expedite the authentication process and reduce bandwidth consumption involved in data transmission and/or processing. In some embodiments, according to a first candidate authentication protocol of the plurality of candidate authentication protocols, in response to determining, based on the assessment, that an authentication condition is satisfied, system 100 may determine that the request is authenticated without requesting further information regarding the user account. System 100 may perform steps as described in process 200, e.g., steps 210 and 212 of process 200 as described.

In some embodiments, according to a second candidate authentication protocol of the plurality of candidate authentication protocols, in response to determining, based on the assessment, that the authentication condition is not satisfied, system 100 may request additional authentication information regarding the user account. According to the second candidate authentication protocol, system 100 may generate, for transmission to the mobile device, a first notification requesting the additional authentication information. Examples of the first additional authentication information may include social security number, birthday, driver's license number, an image of a government issued identification document, a proof of residence, or the like, or a combination thereof. The first additional authentication information may be submitted in the form of a text, an image, or the like, or a combination thereof. System 100 may transmit the first notification via a third text message to the mobile device or cause the first notification to be displayed in the webpage on the mobile device. The first notification may include a prompt configured to allow a submission of the first additional authentication information. System 100 may receive, from the mobile device, the first additional authentication information the user has submitted. System 100 may receive information transmitted using a secure protocol. For example, the information corresponding to the first additional authentication information may be encrypted or compressed for transmission from the mobile device to system 100, and system 100 may decrypt or decompress the information to retrieve the first additional authentication information. System 100 may determine whether to authenticate the request based on the first additional authentication information. In response to determining that the request is authenticated based on the first additional authentication information, system 100 may perform steps as described in process 200, e.g., steps 210 and 212 of process 200 as described.

At step 312, process 300 may manage, based on the authentication protocol, the request for access in absence of the physical authentication token.

The above-described steps of process 300 are presented for purposes of illustration and not of limitation. Process 300 may include additional steps or omit one or more of the steps 302-312 described above. For example, in connection with step 306, in response to failing to determine the existence of the user account, system 100 may generate, for transmission to the mobile device, a second notification requesting second additional authentication information. In some embodiments, in response to failing to determine the existence of the user account, system 100 may refrain from retrieving mobile device information relating to the mobile network and associated with the user digital identifier. In some embodiments, in response to failing to determine the existence of the user account, system 100 may generate, for transmission to the mobile device, a second notification requesting second additional authentication information. System 100 may transmit the second notification via a fourth text message to the mobile device or transmit the second notification for display in a webpage on the mobile device, e.g., the webpage configured to allow access of the user account in absence of the physical authentication token. The second additional authentication information system 100 requests may include a second user digital identifier that is different from the user digital identifier associated with the mobile device. Upon receipt of the second user digital identifier, system 100 may perform a second account search based on the second user digital identifier.

In some embodiments, system 100 may proceed with some operations of process 300 before the user inputs any personal or account information, thereby expediting and/or simplifying the authentication process. For example, system 100 may perform account lookup in response to receiving an indication of the user accessing the link to the webpage from the mobile device, as described with reference to 304, before the user provides personal or account information, thereby simplifying/expediting the account lookup process. As another example, in response to locating a user account associated with the third party at 306, system 100 may proceed with retrieving the MNO information based on the user digital identifier at 306 and performing the MNO check at 308 without a user instruction or user input to provide personal or account information, thereby simplifying/expediting the authentication process. In some circumstances, system 100 may authenticate the user request based on a satisfactory MNO check, obviating the need for the user to provide any personal or account information, thereby further simplifying/expediting the authentication process.

Figure 4:
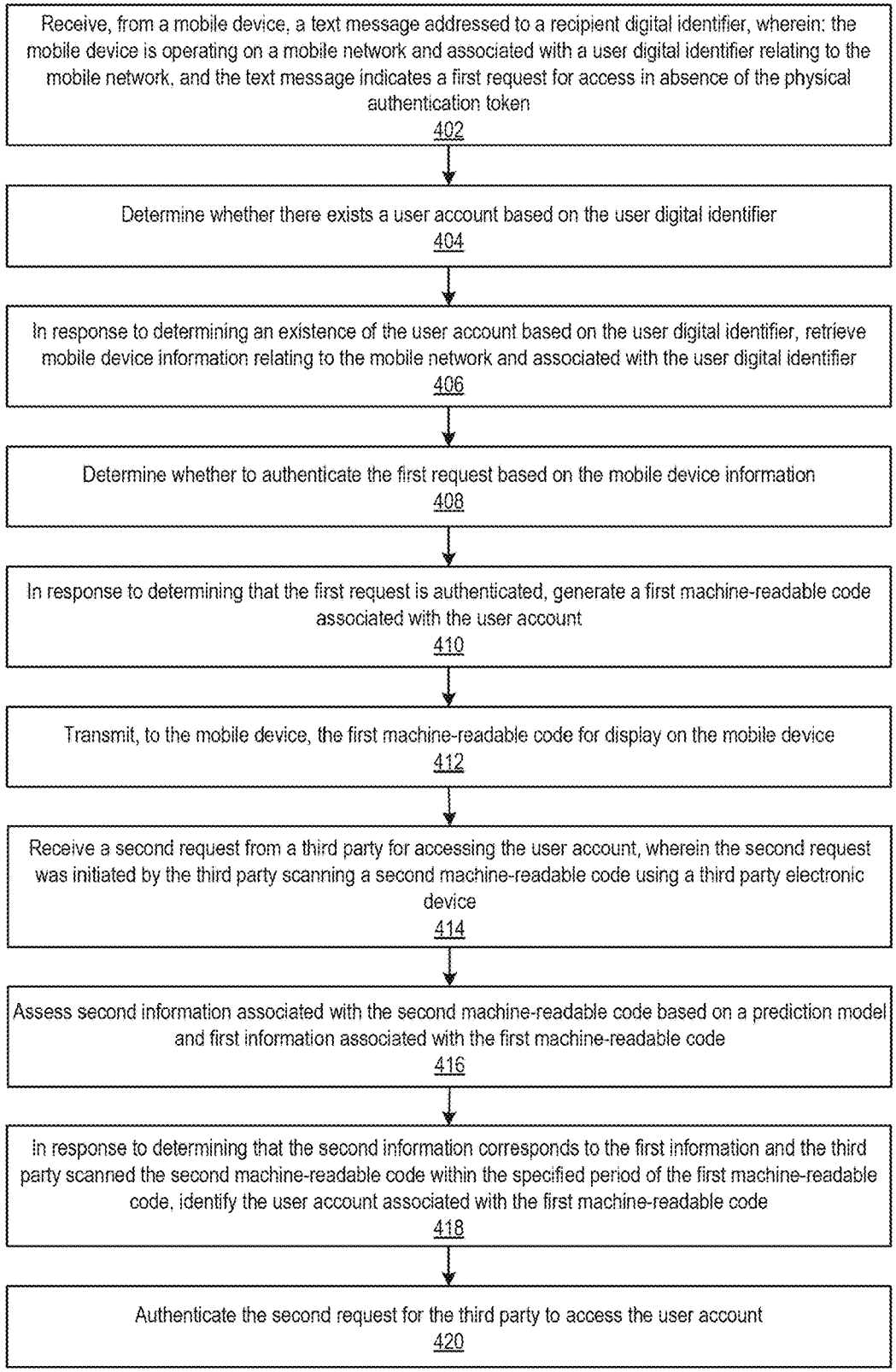
FIG. 4 illustrates an exemplary process for machine-readable code-based access in absence of a physical authentication token, in accordance with one or more embodiments.

FIG. 4 illustrates an exemplary process for machine-readable code-based access in absence of a physical authentication token, in accordance with one or more embodiments. For example, process 400 may represent steps taken by one or more components of system 100 as shown in FIG. 1, or by one or more devices external to system 100. Merely by way of example, a third-party device may train, maintain, and/or update a model for analyzing information for authentication including, e.g., mobile device information, and/or a model for comparing information associated with separate requests (e.g., a user request for account access in absence of a physical authentication token in connection with a transaction and a third party request for transaction by scanning a machine-readable code), and transmit a trained or updated model to system 100, and system 100 may store the trained or updated minority expert model as part of, for example, model 102. As another example, system 100 may train, maintain, and/or update a model for analyzing information for authentication and store the trained or updated model as part of, for example, model 102.

At 402, process 400 may receive, from a mobile device, a text message addressed to a recipient digital identifier. The mobile device may be operating on a mobile network and associated with a user digital identifier relating to the mobile network. The text message may indicate a first request for account access in absence of the physical authentication token. The recipient digital identifier may be associated with a third party. The account associated with the authentication request may belong to a same account type as the recipient digital identifier. More description regarding the recipient digital identifier, including how a user can find the recipient digital identifier, may be found elsewhere in the present disclosure (see, e.g., relevant description in connection with process 200, e.g., step 202 of process 200), and is not repeated here. By employing the designated recipient digital identifier, system 100 may conveniently recognize which type of account (e.g., a department store credit card associated with the same third party as the recipient digital identifier) an authentication request from the user is likely to pertain to, thereby improving the efficiency and/or accuracy of the authentication process.

At step 404, process 400 may determine whether there exists a user account based on the user digital identifier. At step 406, process 400 may retrieve, in response to determining an existence of the user account based on the user digital identifier, mobile device information relating to the mobile network and associated with the user digital identifier. More description regarding the mobile device information may be found elsewhere in the present disclosure (see, e.g., relevant description in connection with process 200, e.g., step 206 of process 200), and is not repeated here. Retrieval of mobile device information from the mobile network or vendor may take time and/or incur costs. Accordingly, in some embodiments, system 100 may perform one or more prerequisite checks before the retrieval including as described in connection with processes 200 and 300 as illustrated in FIGS. 2 and 3.

At step 408, process 400 may determine whether to authenticate the first request based on the mobile device information. More description regarding the mobile device information may be found elsewhere in the present disclosure (see, e.g., relevant description in connection with process 200, e.g., step 208 of process 200) and is not repeated here.

At step 410, process 400 may generate, in response to determining that the first request is authenticated, a first machine-readable code associated with the user account. At step 412, process 400 may transmit, to the mobile device, the first machine-readable code for display on the mobile device. System 100 may cause the first machine-readable code to be displayed in a webpage configured to allow access of the user account in absence of the physical authentication token; or transmit, to the mobile device, a third text message including the first machine-readable code for display on the mobile device.

The first machine-readable code may include a barcode, a QR code, or the like. The machine-readable code may embed multifaceted information. For example, the first machine-readable code may include a credit limit for a transaction or transactions within a time limit (e.g., 1 day, 1 hour, etc.), account information of the user account, a temporary account identifier corresponding to the user account, merchant identifier (the identity of the third party with which a transaction using the first machine-readable code may proceed), transaction location (e.g., the location of the third party where the user initiated the authentication request), timestamp (e.g., the time point when the machine-readable code is generated), currency (e.g., the currency in which the transaction is being conducted), or the like, or a combination thereof. In some embodiments, the first machine-readable code may be temporary and valid for a specified period. For example, the first machine-readable code may be valid for 5 minutes, 10 minutes, etc., from a reference time point. Examples of the reference time point may be the time when the machine-readable code is generated, the time when the machine-readable code is sent to the mobile device, etc. Upon expiry of the time period, the machine-readable code may become invalid so that no transaction may occur with the user account based on the machine-readable code. The use of first machine-readable code may obviate the need to transmit an actual permanent account information to the mobile device or to the third party, thereby improving account security.

At step 414, process 400 may receive a second request from a third party for accessing the user account. The second request may have been initiated by the third party scanning a second machine-readable code using a third party electronic device. At step 416, process 400 may assess second information associated with the second machine-readable code based on a prediction model and first information associated with the first machine-readable code.

The first information may include at least one of: a temporary account identifier of the user account, an account type of the user account, a limit on a transaction amount, a timestamp that represents a beginning time or an expiration time of the specified period of the first machine-readable code, a location of the mobile device when the text message (that has initiated the authentication process) is sent, the user digital identifier, or the third party that is associated with a recipient digital identifier to which the text message is addressed. For example, the first information associated with the first machine-readable code may omit a permanent account identifier of the user account, and process 400 may identify the permanent account identifier of the user account to be accessed when the second request for the third party to access the user account is authenticated.

The second information may include at least one of: a temporary account identifier of the user account, an account type of the user account, a limit on a transaction amount, a timestamp that represents a beginning time or an expiration time of the specified period of the first machine-readable code, a location of the mobile device when the text message is sent, the user digital identifier, the third party that is associated with a recipient digital identifier to which the text message is addressed, a location of the third party, or a transaction amount associated with the second request. System 100 may retrieve the second information from the second request. System 100 may receive the second information transmitted using a secure protocol. For example, the second information may be encrypted or compressed to generate information for transmission from the third party (e.g., from a third-party electronic device) to system 100, and system 100 may decrypt or decompress the information to retrieve the second information.

At step 416, process 400 may assess second information associated with the second machine-readable code based on a prediction model and first information associated with the first machine-readable code. Merely by way of example, the first information may be in the form of a first feature vector representing one or more features of the first request, the second information may be in the form of a second feature vector representing one or more features of the second request, and system 100 may assess the second information associated with the second machine-readable code by extracting, from the first information, the first feature vector; extracting, from the second information, the second feature; and inputting the first feature vector and the second feature vector into the prediction model. The prediction model may be a machine learning model trained to output a determination whether the second information corresponds to the first information.

At step 418, process 400 may identify, in response to determining that the second information corresponds to the first information and the third party scanned the second machine-readable code within the specified period of the first machine-readable code, the user account associated with the first machine-readable code. At step 420, process 400 may authenticate the second request for the third party to access the user account.

In response to authenticating the second request for the third party to access the user account, system 100 may generate, for transmission to the mobile device, a notification including transaction information that includes at least one of: a verification that the second request is authenticated for the third party to access the user account, a transaction amount relating to the second request, a transaction type relating to the second request, an identity of the third party, a location of the third party, an account type of the user account, an issuer of the user account, or the like, or a combination thereof. In some embodiments, the notification may further include a prompt inviting the user to confirm or reject the transaction information; system 100 may receive a user instruction in response to the notification, in which the user instruction indicates the confirmation or the rejection of the transaction information, and determine, based on the user instruction, whether to revoke the access to the user account by the third party.

The above-described steps of process 400 are presented for purposes of illustration and not of limitation. Process 400 may include additional steps or omit one or more of the steps 402-420 described above. For example, in connection with step 418, in response to determining that the second information fails to correspond to the first information or that the third party scanned the second machine-readable code outside the specified period of the first machine-readable code, system 100 may determine not to authenticate the second request. As another example, system 100 may examine integrity of the second information based on a secure protocol before assessing the second information at step 416. In response to determining that the integrity of the second information is compromised, system 100 may determine not to authenticate the second request. In response to determining not to authenticate the second request, system 100 may reject the second request. Additionally or alternatively, system 100 may generate, for transmission to at least one of the mobile device or the third-party electronic device, a notification indicating an authentication failure of the second request.

As a further example, in response to determining that the first machine-readable code has expired, system 100 may generate, for transmitting to the mobile device, a notification indicating that the first machine-readable code has expired; and voiding the first machine-readable code. The notification may further include a request inviting the user to indicate whether to issue a new machine-readable code.

In some embodiments, system 100 may proceed with some operations of process 400 before the user inputs any user information, thereby expediting and/or simplifying the authentication process. For example, in response to locating a user account associated with the third party at 406, system 100 may proceed with retrieving the MNO information based on the user digital identifier and performing the MNO check at 408 without a user instruction or user input to provide personal or account information, thereby simplifying/expediting the authentication process. In some circumstances, system 100 may authenticate the user request based on a satisfactory MNO check, obviating the need for the user to provide any personal or account information, thereby further simplifying/expediting the authentication process.

Figure 5:
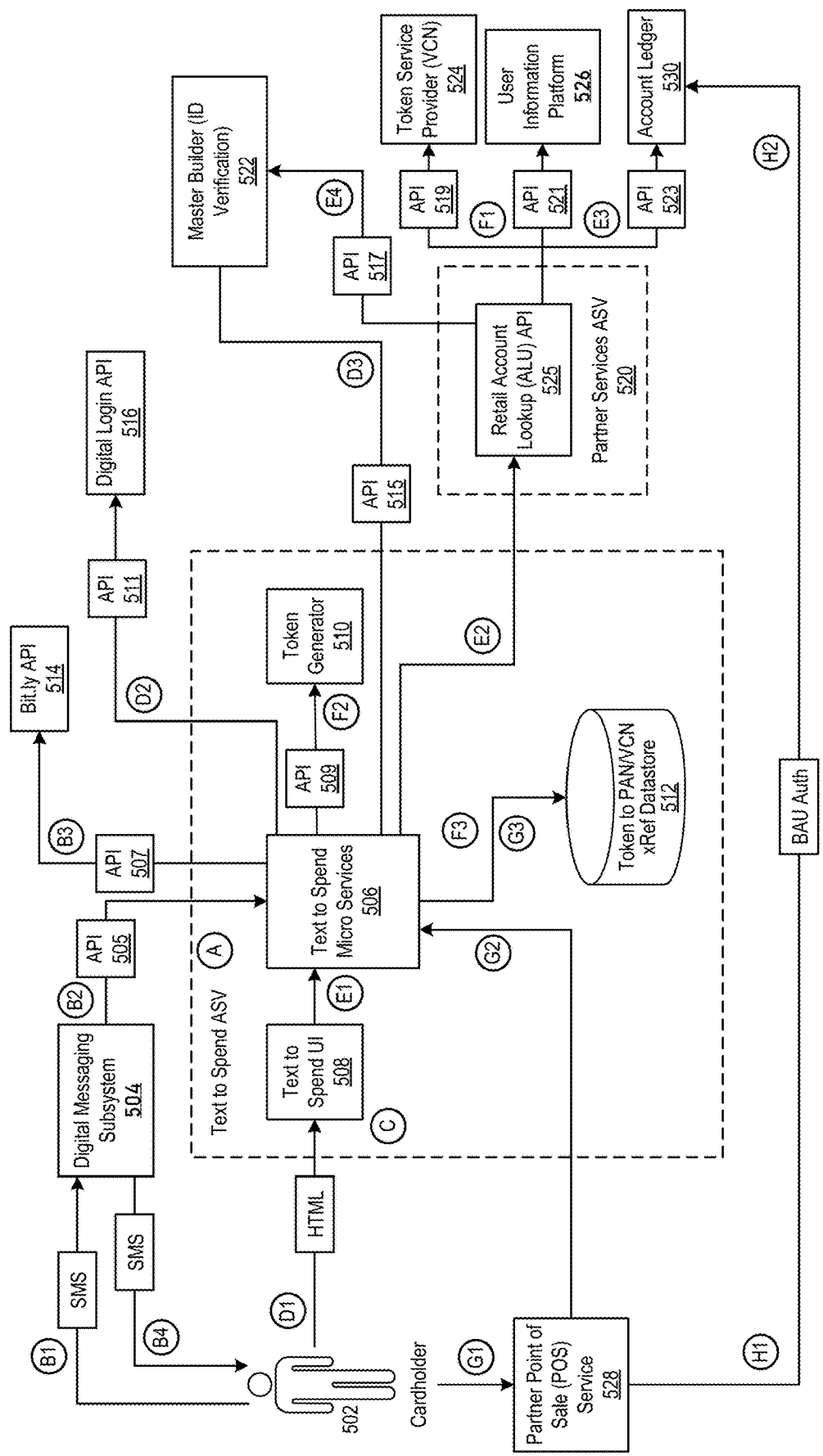
FIG. 5 shows a high-level architecture diagram of text messaging-based self-service authentication in absence of a physical authentication token, in accordance with one or more embodiments.

FIG. 5 shows a high-level architecture diagram of text messaging-based self-service authentication in absence of a physical authentication token, in accordance with one or more embodiments. The process may also be referred to as Text-to-Spend, indicating a transaction process based on texting via a mobile device in absence of a physical authentication token (e.g., a credit card). Box A, referred to as Text to Spend Application SerVice (ASV), includes exemplary infrastructure (e.g., system 100, or a portion thereof) to facilitate the Text-to-Spend process. Text-to-Spend (also referred to as "T2S" for brevity) Micro Services 506 may be configured to coordinate various components of infrastructure A and facilitate communication or interaction between cardholder (also referred to as user) 502 and a third party (e.g., a partner of system 100 including, e.g., a retail store), including orchestrating calls outside infrastructure A, to facilitate various functions or operations involved in the Text-to-Spend process. In some embodiments, Text-to-Spend Micro Services 506 may include multiple micro service modules. See, e.g., FIGS. 8, 9, 10, 12, and 13, and relevant description thereof. Text-to-Spend user interface (UI) 508 may be configured to facilitate communication or interaction between cardholder 502 and Text-to-Spend Micro Services 506. Token Generator 510 may be configured to generate a token (e.g., an access token, a machine-readable code described with reference to processes 200, 300, and 400 as illustrated in FIGS. 2-4, etc.) based on a request or call from another component of infrastructure A (e.g., Text-to-Spend Micro Services 506) or a component external to and in communication with infrastructure A. Datastore 512 may be configured to store a token that Token Generator 510 has generated. For example, Datastore 512 may store a temporary machine-readable code corresponding to a user account and linking/cross-referencing a primary account number (PAN) with a temporary virtual card number (VCN) associated with the user account. A PAN may be the number on a user's credit card number. A user account may be assigned with a long-term PAN and multiple VCNs each of which is valid for its respective time period. The PAN of a user account may change. For example, a PAN of a user account (e.g., a credit card) may change when a new card is issued to replace an existing card.

Steps B1 through B4 in FIG. 5 show initial operations (substantially corresponding to, e.g., prerequisite checks described with respect to processes 200, 300, and 400 as illustrated in FIGS. 2-4) of text messaging-based self-service authentication in absence of a physical authentication token. Cardholder 502 may indicate a user request for account access in absence of a physical authentication token by sending a text message to a recipient digital identifier (e.g., an SMS short code) or scanning a machine-readable code (e.g., a QR code) (B1) using a mobile device such that digital messaging subsystem 504 may receive the user request from cardholder 502. Subsystem 504 may communicate, via API 505, the user request and associated information (e.g., the user digital identifier of the mobile device through which the user has sent the request to Text-to-Spend Micro Services 506 (B2)). In response to the user request, Text-to-Spend Micro Services 506 may call, via API 507, an API 514 to provide a link to a webpage through which cardholder 502 may access a user account in absence of the physical authentication token. As illustrated, API 514 may be configured to generate a shortened URL for the webpage (Bit.ly API as illustrated). Subsystem 504 may transmit the link to cardholder 502 by, e.g., sending a text message to the mobile device (B4). See also, e.g., FIGS. 7 and 8.

Box C including Text-to-Spend UI 508 may be configured as a dynamic, stand-alone user interface adaptable based on risk characteristics of users. Steps D1 through D3 illustrate operations in which cardholder 502 is redirected to a website for authentication via Digital Login or by providing Personal Identifiable Information (PII) and/or Government ID (GovID). Cardholder 502 may access Text-to-Spend UI 508 via Hypertext Markup Language (HTML) (D1), e.g., the webpage corresponding to the link subsystem 504 provides to cardholder 502 in response to the user request. Text-to-Spend UI 508 may notify Text-to-Spend Micro Services 506 of access to the webpage by cardholder 502, which may indicate the intention and/or attempt by cardholder 502 to proceed further with the authentication process; in response Text-to-Spend Micro Services 506 may call Digital Login API 516 via API 511 (D2) so that cardholder 502 can proceed with the authentication process by digital login (e.g., by providing login credentials). Additionally or alternatively, Text-to-Spend Micro Services 506 may call, via API 515, Master Builder 522 to perform an identity verification (D3) in which cardholder 502 is prompted to provide an identification information (e.g., an image of cardholder 502's driver license). See also, e.g., FIGS. 11-15, 17, and 18.

In connection with steps D1-D4, steps E1 through E4 show operations in which account search is performed using either Profile ID (from Digital Login) or PII/GovID (non-Digital Login) cardholder 502 provides during the authentication process. Text-to-Spend UI 508 may notify Text-to-Spend Micro Services 506 of access to the webpage by cardholder 502 (E1), which may indicate the intention and/or attempt by cardholder 502 to proceed further with the authentication process; in response Text-to-Spend Micro Services 506 may call Retail Account Lookup (ALU) API 525 (E2). Retail Account Lookup (ALU) API 525 may be part of Partner Services Application SerVice (ASV) platform 520 that in communication with infrastructure A. A retail account may be a user account (e.g., a credit card) associated with a third party (e.g., a retail department store), e.g., a partner of system 100 (e.g., a credit card issuer). ALU API 525 may access a user information platform 526 via API 521 based on Profile ID (e.g., digital login credentials) (E3). User information platform 526 may include customer information (also referred to as user information) including, e.g., name, address, phone, or the like, or a combination thereof. Accordingly, ALU API 525, by calling user information platform 526, may retrieve user information based on personal identity information of cardholder 502 including, e.g., phone number, PII, GovID. ALU API 525 may perform, by calling Master Builder 522 via API 517, validation of personal identity information, such as driver's license information (E4). ALU API 525 may be operably connected to account ledger 530 via API 523. Account ledger 530 may serve as a system for holding account information. Account information of a user account (e.g., an account number such as a credit card number) retrieved from the account ledger 530 may be transmitted to Token Service Provider 524 via API 519 to obtain a VCN associated with the user account.

Steps F1 through F3 illustrate operations for token generation if a user account is found. Upon finding a user account (e.g., as described in steps E1-E4), ALU API 525 may call, via API 519, Token Service Provider 524 to generate a token including a virtual card number that corresponds to the user account (F1). Based on an identified user account, Token Generator 510 to generate a token that corresponds to the user account (F2). A token may include a machine-readable code. The token may be temporary and valid for a specific period of time (e.g., 10 minutes after the token is generated or transmitted to the mobile device of cardholder 502). The token generation may be performed in such a way that sensitive payment card data is not directly involved or stored within a third-party system and a token, instead of actual information of a credit card (or another type of payment card), is used in a transaction between cardholder 502 and the third party. Accordingly, the solution is out of scope for Payment Card Industry Data Security Standard (PCI DSS) or "non-PCI." Text-to-Spend Micro Services 506 may store the token in Datastore 512 and/or provide the token to cardholder 502 (F3). For example, Token Service Provider 524 may generate a VCN, and Datastore 512 may store the generated VCN (e.g., in the form of a tokenized VCN); Text-to-Spend Micro Services 506 may be in control of storing the VCN generated by Token Service Provider 524 in Datastore 512.

Steps G1 through G3 show operations in which cardholder 502 presents the token (e.g., a machine-readable code) at a point of sale (POS) and POS requests an actual PAN or VCN. The POS may be a third party that is a partner of system 100 (e.g., a credit card issuer). The PAN/VCN may be field-level encrypted for transmitting to the mobile device of cardholder 502. When cardholder 502 presents the token to Partner POS Service 528 (G1), Partner POS Service 528 may send, by scanning the token, a request for transaction via the user account associated with the token to Text-to-Spend Micro Services 506 (G2). Text-to-Spend Micro Services 506 may retrieve token information from the request (from Partner POS Service 528) and compare it with corresponding information stored in Datastore 512 to identify the actual account information (G3) on the basis of which the requested transaction occurs.

Steps H1 and H2 illustrate the POS uses an actual PAN/VCN to processes transaction through Business As Usual (BAU) Authorization & Settlement rails (which may vary by partners). The POS may be a third party that is a partner of system 100 (e.g., a credit card issuer). Partner POS Service 528 may send, by scanning the token, a request for transaction via the user account associated with the token to account ledger 530 (H2), subject to a successful BAU authentication (H1).

In some embodiments, multiple APIs as illustrated in FIG. 5 may be integrated. For example, at least two of API 505, 507, 509, and 511 may be integrated as one API. In some embodiments, at least one of the APIs described above may be omitted so that two components operably connected via the at least one API may be connected directly. For example, at least one of APIs 507, 509, and 511 may be omitted such that Text-to-Spend Micro Services 506 may call Bit.ly API 514, Digital Login API 516, or Token Generator 510 directly. Components shown in FIG. 5 belong to system 100 except for Bit.ly API 514 and Partner POS Service 528, which are third-party devices.

Figure 6:
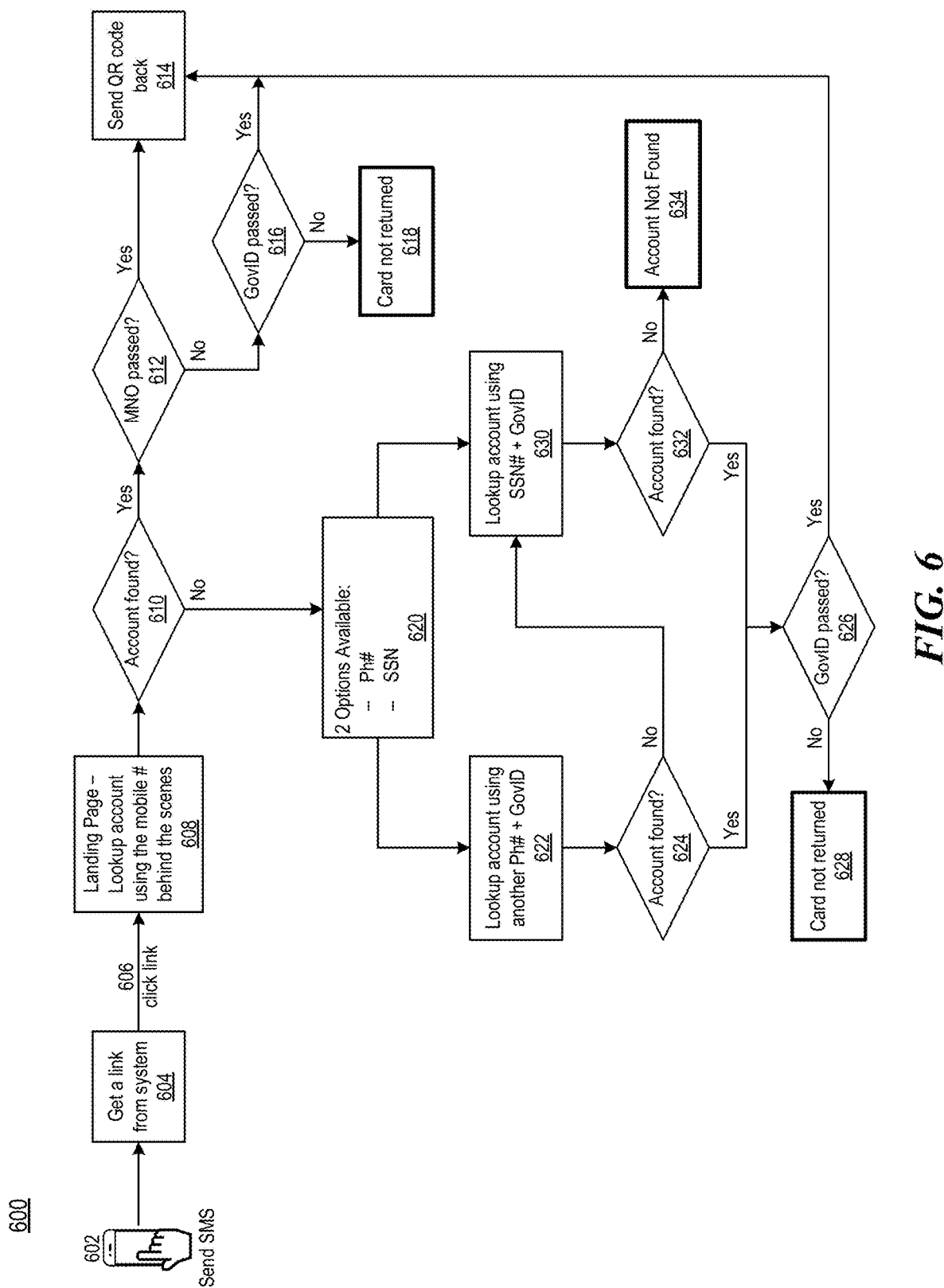
FIG. 6 shows a user journey map in accordance with one or more embodiments.

FIG. 6 shows a user journey map 600 in accordance with one or more embodiments of the present disclosure. At 602, a user may send a first text message from a mobile device to a designated recipient digital identifier to indicate a request for account access in absence of the physical authentication token. The mobile device may be in operation on a mobile network and associated with a user digital identifier relating to the mobile network. The recipient digital identifier may be associated with a third party. More description regarding the recipient digital identifier, including how a user can find the recipient digital identifier, may be found elsewhere in the present disclosure (see, e.g., relevant description in connection with process 200, e.g., step 202 of process 200), and is not repeated here. By employing the designated recipient digital identifier, system 100 may conveniently recognize which type of account (e.g., a department store credit card associated with the same third party as the recipient digital identifier) an authentication request from the user is likely to pertain to, thereby improving the efficiency and/or accuracy of the authentication process. In some embodiments, the recipient digital identifier may include a machine-readable code (e.g., a QR code), and the user may indicate the request for account access in absence of the physical authentication token by scanning the machine-readable code.

At 604, the user may receive a link from system 100. The link may be a short link. System 100 may send the link to the mobile device via a second text message. By clicking the link on the mobile device at 606, the user may be directed to a landing page at 608; meanwhile system 100 may perform an account lookup using the user digital identifier (e.g., a mobile phone number) behind the scenes, without any user input of personal or account information or a user instruction, thereby simplifying/expediting the account lookup process and the overall authentication process.

If system 100 finds such a user account associated with the third party at 610, system 100 may retrieve mobile device information (e.g., MNO information) based on the user digital identifier from the mobile network or a vendor and perform an assessment (e.g., an MNO check). System 100 may retrieve the MNO information and/or perform the MNO check without any user input of personal or account information or a user instruction, thereby simplifying/expediting the account lookup process and the overall authentication process. If system 100 determines that the MNO check passes at 612, system 100 may transmit a machine-readable code (e.g., a QR code) to the mobile device at 614. The user may use the machine-readable code as a payment token in a transaction with the third party. More description regarding the machine-readable code may be found elsewhere in the present disclosure (see, e.g., relevant description in connection with process 200, e.g., step 210 of process 200; process 400, e.g., step 410 of process 400), and is not repeated here.

If system 100 determines that the MNO check fails at 612, system 100 may invite the user to provide additional authentication information including, e.g., a GovID, and perform an assessment based on the additional authentication information the user provides. If system 100 determines that the assessment based on the additional authentication information is satisfactory at 616, system 100 may issue a machine-readable code as described with reference to 614. If system 100 determines that the assessment based on the additional authentication information is unsatisfactory at 616, system 100 may determine not to grant the user request by not returning a card or a machine-readable code corresponding to the user account at 618.

If system 100 does not locate a user account associated with the third party at 610, system 100 may provide other options for the user to proceed further at 620 by providing additional authentication information other than the user digital identifier for an account lookup at 622. Examples of additional information may include a phone number (e.g., a home phone number, a work phone number), a social security number, a government ID, or the like, or a combination thereof. For example, system 100 may provide a first option including a phone number different from the user digital identifier and a government ID at 622 and a second option including a social security number and a government ID at 630 to perform an account lookup.

According to the first option, if system 100 finds a user account based on such authentication information at 624, system 100 may perform an assessment based on a government ID the user provides. If system 100 determines that the assessment based on the government ID is satisfactory at 626, system 100 may issue a machine-readable code as described with reference to 614. If system 100 determines that the assessment based on the government ID is unsatisfactory at 626, system 100 may determine not to grant the user request by not returning a card or a machine-readable code corresponding to the user account at 628. In some embodiments, if system 100 finds no user account based on the phone number and the government ID at 624, system 100 may provide a third option for performing another account lookup based on the social security number and the government ID at 630.

According to the second or third option, if system 100 finds a user account based on such authentication information at 632, system 100 may perform an assessment based on a government ID the user provides. If system 100 determines that the assessment based on the government ID is satisfactory at 626, system 100 may issue a machine-readable code as described with reference to 614. If system 100 determines that the assessment based on the government ID is unsatisfactory at 626, system 100 may determine not to grant the user request by not returning a card or a machine-readable code corresponding to the user account at 634.

Figure 7:
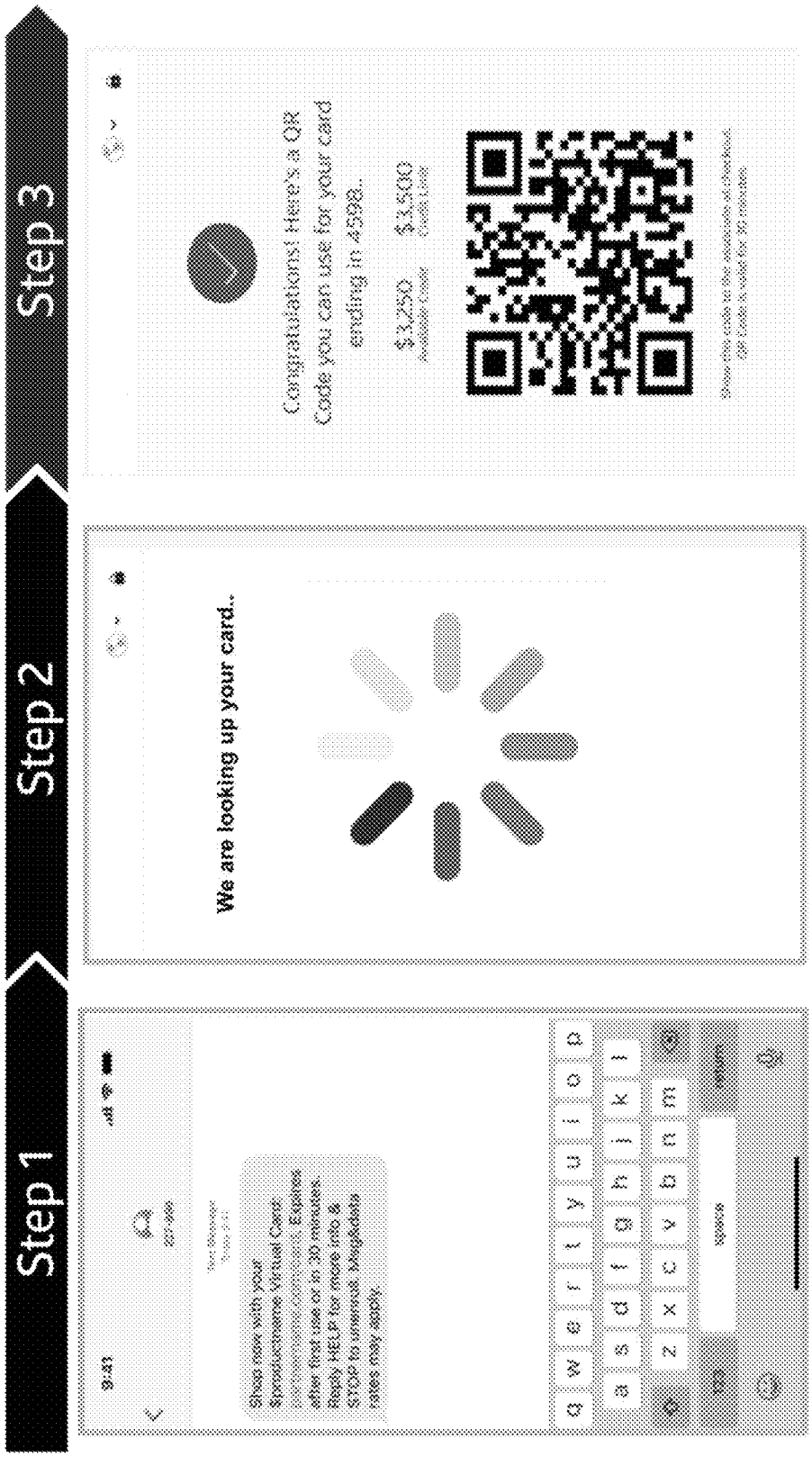
FIGS. 7-18 illustrate user interface pages of example use cases and flowcharts of operations therein, in accordance with one or more embodiments.

FIG. 7 illustrates user interface pages of a use case in which a user request for authentication in absence of a physical authentication token passes based on an MNO check, in accordance with one or more embodiments. At step 1, system 100 sends a text message to a mobile device of the user. The text message may include a link to a webpage for account access in absence of the physical authentication token. The text message may include instructions regarding the authentication process using the link. System 100 may send the text message in response to receiving, from the mobile device, an initial text message addressed to a recipient digital identifier designated by system 100. The recipient digital identifier and the user account relating to the user request may be associated with a same third party (e.g., a department store that is a partner of system 100). More description regarding step 1 may be found elsewhere in the present disclosure. The mobile device may be operating on a mobile network and associated with a user digital identifier relating to the mobile network.

Figure 8:
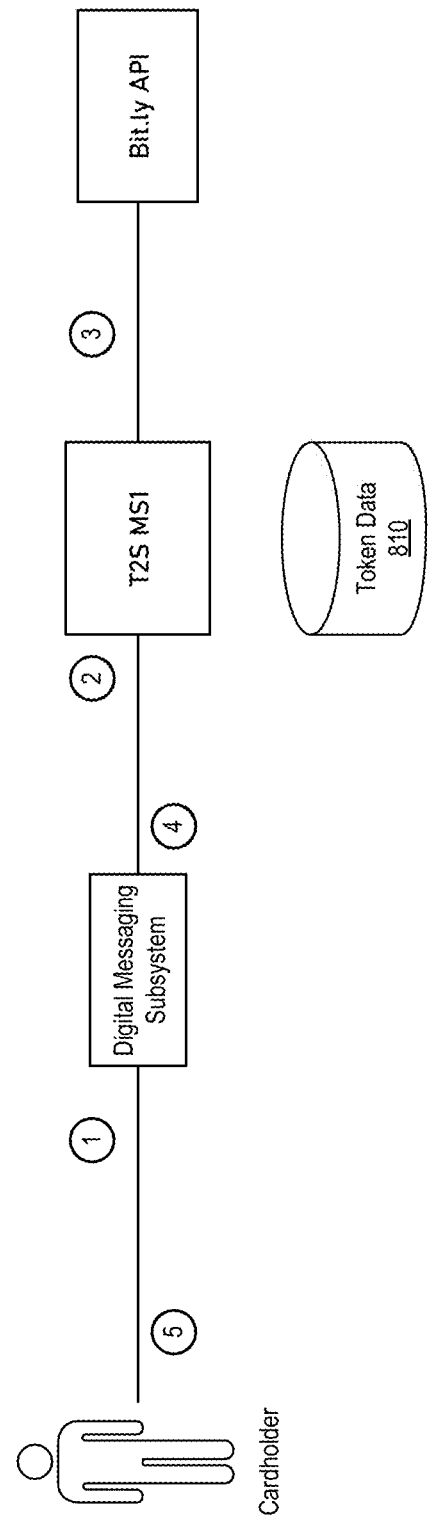

FIG. 8 shows a flowchart for step 1 of FIG. 7 in accordance with one or more embodiments of the present disclosure. A user (also referred to as a cardholder) may indicate a user request for account access in absence of a physical authentication token by sending a text message to a recipient digital identifier (e.g., an SMS short code) or scanning a machine-readable code (e.g., a QR code) (①) using a mobile device such that digital messaging subsystem 504 may receive the user request from the user. Digital messaging subsystem 504 may communicate the user request and associated information (e.g., the user digital identifier of the mobile device through which the user has sent the request to digital messaging subsystem 504 to T2S Micro Service 1 (MS1)) and call T2S MS1 to process the user request (②). T2S MS1 may be part of Text-to-Spend Micro Services 506. In response to the user request, T2S MS1 may produce a URL to invoke the authentication by calling the Bit.ly API (③) (e.g., Bit.ly API 514). T2S MS1 may call digital messaging subsystem 504 with the URL information (④), and digital messaging subsystem 504 may then transmit the link to the user by, e.g., sending a text message to the mobile device to initiate the authentication process (⑤). At least one of digital messaging subsystem 504, T2S MS1, and Bit.ly API may be operably connected to a data store 810 (referred to as "Token Data" as illustrated in FIG. 8). Data store 810 may be used as a link between various steps or stages of the authentication/transaction process by storing relevant session information. Such session information may be used to direct and/or control information displayed on the webpage or provided to the user by other means to guide the user through the authentication/transaction process. For example, data store 810 may store a short URL tied to the user digital identifier (e.g., a mobile phone number) through which the user sends the user request as described in ①. The short URL stored in data store 810 may include a unique identify (ID) tied to the user digital identifier. Accordingly, when T2S MS1 detects that the short URL is accessed, T2S MS1 performs subsequent steps or operations based on the user digital identifier (e.g., look up user accounts associated with the user digital identifier, and/or perform an MNO check or an MNO fraud check as described in FIG. 9 based on the user digital identifier).

At step 2 of FIG. 7, system 100 may perform an account lookup based on the user digital identifier. System 100 may initiate the account lookup in response to receiving an indication of the user accessing the link to the webpage from the mobile device, before the user provides personal or account information, thereby simplifying/expediting the account lookup process. In response to receiving an indication of the user accessing the link to the webpage from the mobile device (indicating a user intention to proceed with the authentication process) and/or locating the user account associated with the third party, system 100 may proceed with retrieving the MNO information based on the user digital identifier and performing the MNO check without a user instruction or user input to provide personal or account information, thereby simplifying/expediting the authentication process. In some circumstances, system 100 may authenticate the user request based on a satisfactory MNO check, obviating the need for the user to provide any personal or account information, thereby further simplifying/expediting the authentication process. More description regarding step 2 may be found elsewhere in the present disclosure.

Figure 9:
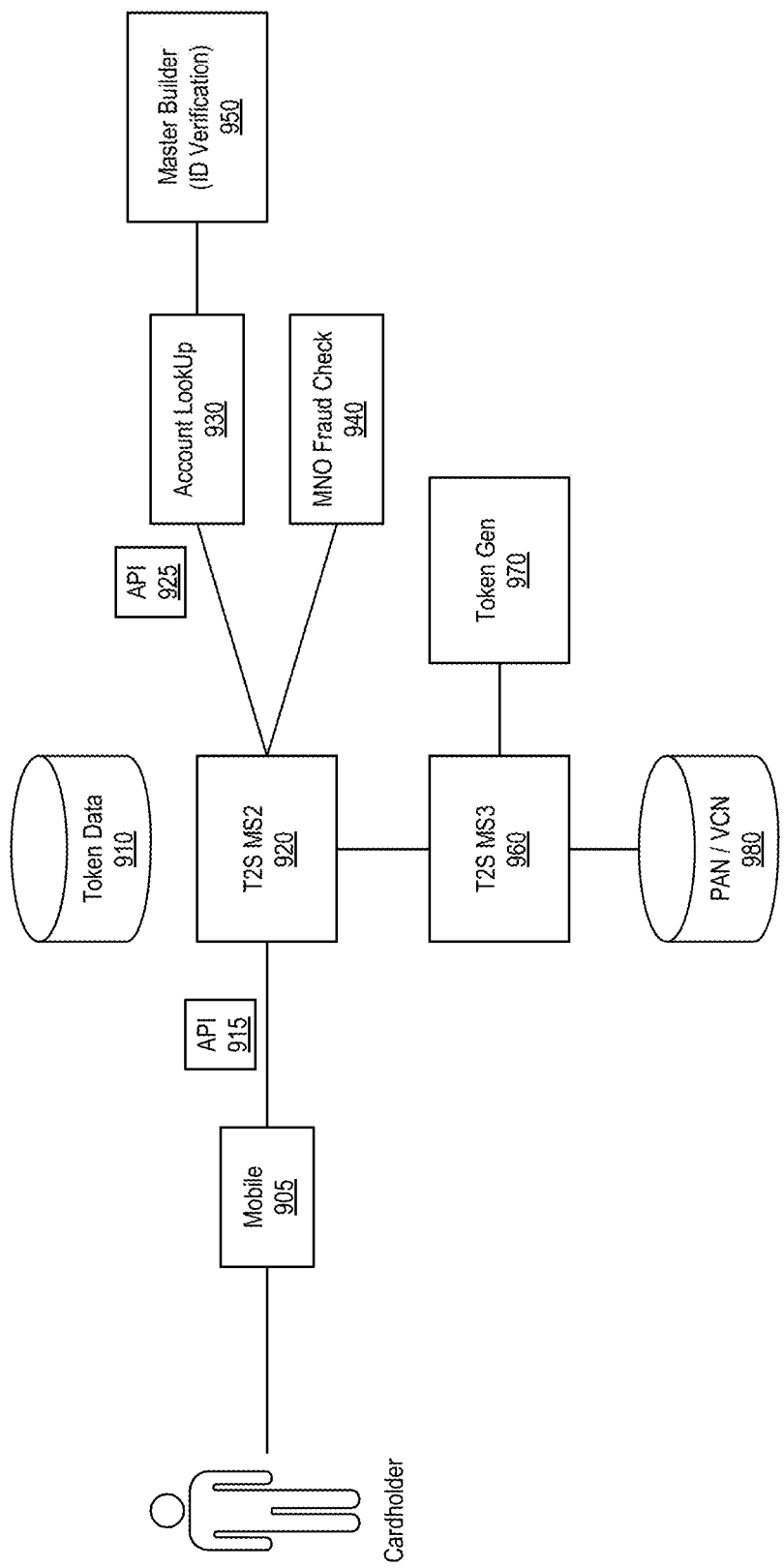

FIG. 9 shows a flowchart for step 2 of FIG. 7 in accordance with one or more embodiments of the present disclosure. Following step 1 as illustrated in FIGS. 7 and 8, the user (also referred to as cardholder) may click, on the mobile device 905, the link received from digital messaging subsystem 504, which calls the mobile interface. T2S MS2 920 may be part of Text-to-Spend Micro Services 506. The mobile device 905 may call, via API 915, T2S MS2 920 to provide the user digital identifier (e.g., a mobile phone number) to T2S MS2 920. T2S MS2 920 may call, via API 925, Account Lookup API 930 to find a matching account number (e.g., the account number of an account associated with the third party that the user intends to perform a transaction with via the user account). If the account is found (one account or one VCN), T2S MS2 may call MNO Fraud Check API 940 for fraud validation. For instance, subsequent to a successful MNO check based on the MNO information, T2S MS2 920 may perform an MNO fraud check to verify whether there is any other fraud associated with the user or user account (e.g., a credit card account associated with the third party). If the MNO fraud check is satisfactory, T2S MS2 920 calls T2S MS3 960 to generate and store the token information. T2S MS3 960 may call the Token Generator 970 to create a QR code. T2S MS3 960 may store the PAN/VCN associated with the authenticated user account to the QR code details in Datastore 980 and return the generated code to T2S MS2 920. Datastore 980 may store information that cross-references the token or machine-readable code presented to the user (e.g., in the form of a QR code or other structure), to the actual account information. This may obviate the need to transmit the account information (e.g., credit card number) to the user over a communication network, expose the account information directly to the user and/or the third party, while enable instead the third party (e.g., a merchant (POS)) to access the user account based on the machine-readable code (see, e.g., relevant description in FIG. 10 at 1015). T2S MS2 920 may return the QR code to the mobile device 905, which in turn may display the QR code to the user. If the MNO fraud check is unsatisfactory, system 100 may request that the user provide additional authentication information, e.g., a government ID or a Social Security number for authentication via Master Builder 950. At least one of T2S MS2 920 or T2S MS3 960, or other components illustrated in FIG. 9, may be operably connected to a data store 910 (referred to as "Token Data" as illustrated in FIG. 9). Data store 910 may be substantially the same as or similar to data store 810, the description of which is not repeated here.

At step 3 of FIG. 7, in response to a satisfactory MNO check, system 100 may return a machine-readable code to the mobile device. System 100 may transmit the machine-readable code to the mobile device in a text message. Additionally or alternatively, system 100 may cause the machine-readable code to be displayed within the webpage on the mobile device. The text message providing the machine-readable code on the webpage may also include relevant information including, e.g., a partial account number of the user account whose access is authorized, the credit limit, how to use the machine-readable code, the time limit for using the machine-readable code, or the like, or a combination thereof. The information may allow the user to double check the account information, learn the credit limit, etc. If the user identifies anything suspicious or unsatisfactory (e.g., the partial account number is inaccurate, the credit limit is too low), the user may take actions (e.g., avoiding using the machine-readable code). The machine-readable code may be configured to be used as an access token (e.g., a payment token), allowing the third party to access the user account by scanning the machine-readable code (e.g., within the specified period when the machine-readable code is valid). More description regarding the machine-readable code may be found elsewhere in the present disclosure (see, e.g., relevant description in connection with process 200, e.g., step 210 of process 200; process 400, e.g., step 410 of process 400), and is not repeated here. More description regarding step 3 may be found elsewhere in the present disclosure.

Figure 10:
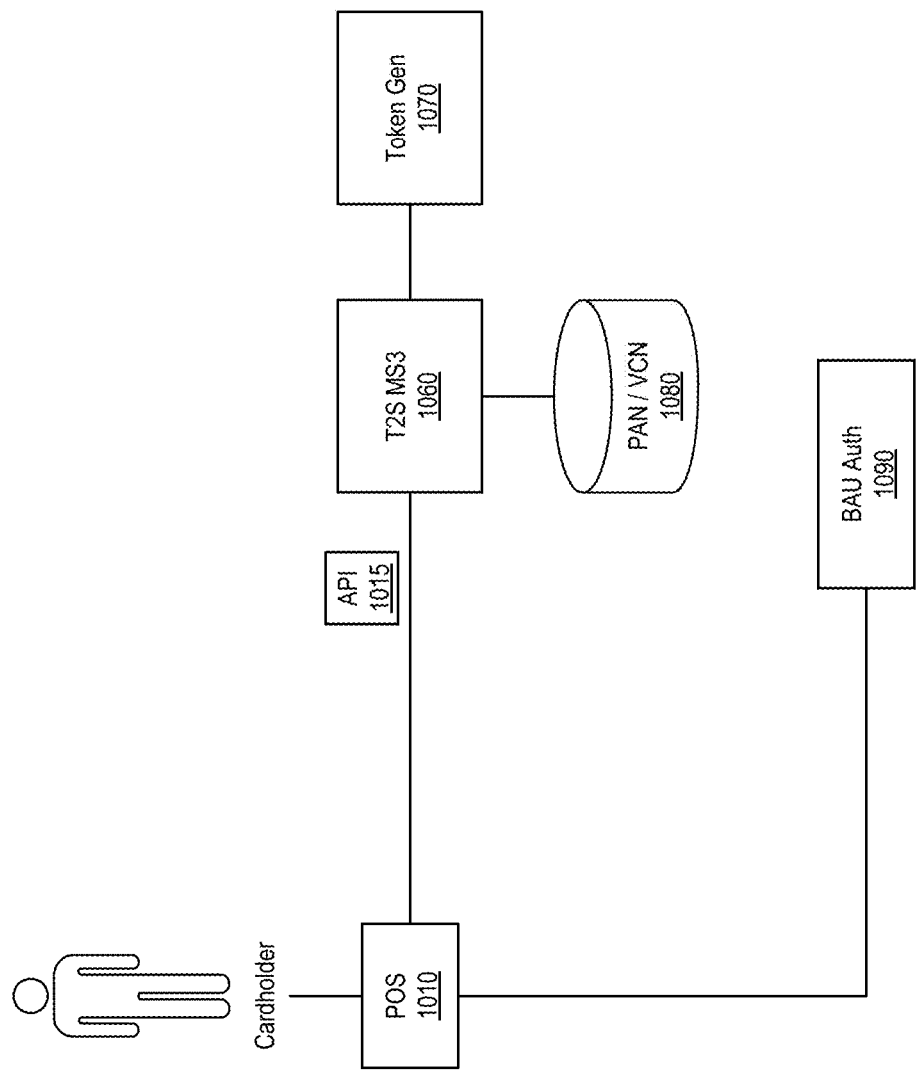

FIG. 10 shows a flowchart for step 3 of FIG. 7 in accordance with one or more embodiments of the present disclosure. The user may show the QR code to POS 1010 to initiative the authentication process. The QR code may be generated by Token Generator 1070. POS 1010 may call, via API 1015, T2S MS3 1060 to retrieve the PAN/VCN associated with the QR code from Datastore 1080. T2S MS3 1060 may retrieve the matching PAN/VCN from Datastore 1080 and returns to POS 1010. After obtaining the corresponding PAN/VCN, POS 1010 may initiate a BAU authentication process 1090.

Figure 11:
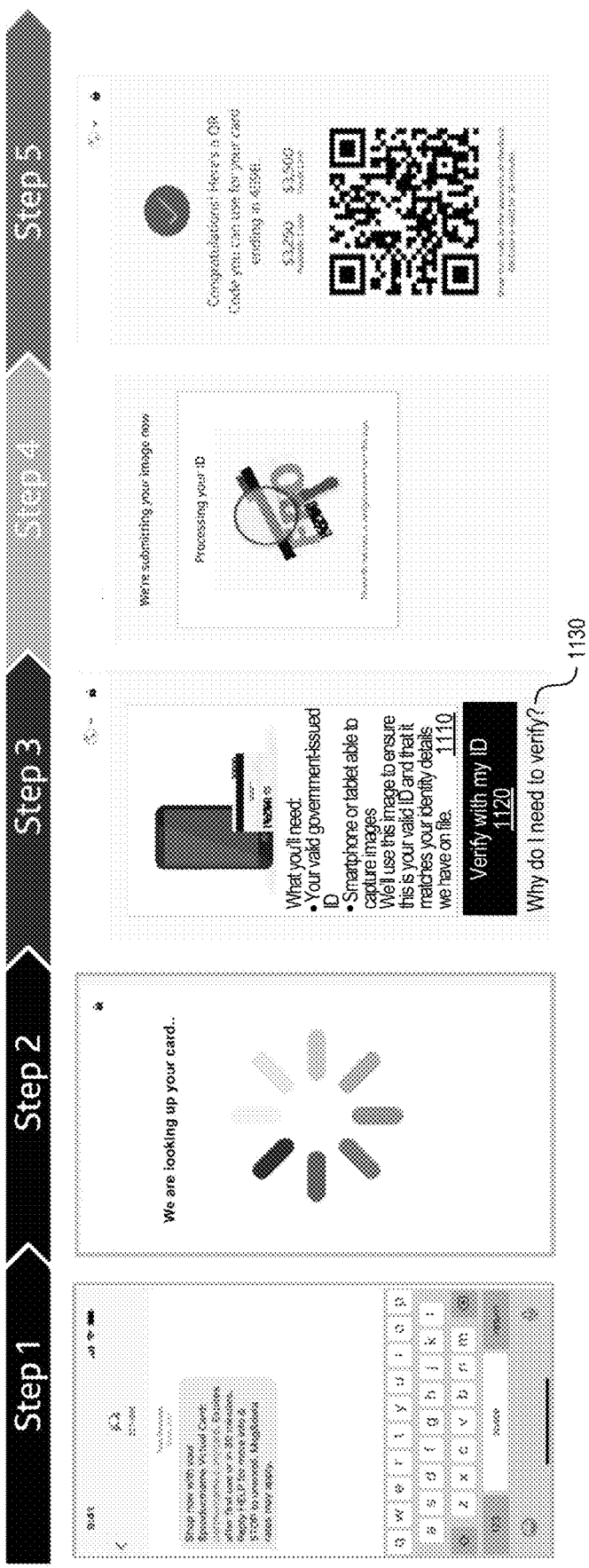

FIG. 11 illustrates user interface pages of a use case in which a user request for authentication in absence of a physical authentication token fails based on an MNO check, in accordance with one or more embodiments. Step 1 of FIG. 11 may be the same as step 1 of FIG. 7 and the flowchart of FIG. 8, the description of which is not repeated here. At step 2, system 100 may perform an account lookup based on the user digital identifier. System 100 may initiate the account lookup in response to receiving an indication of the user accessing the link to the webpage from the mobile device, before the user provides personal or account information, thereby simplifying/expediting the account lookup process. In response to receiving an indication of the user accessing the link to the webpage from the mobile device (indicating a user intention to proceed with the authentication process) and/or locating the user account associated with the third party, system 100 may proceed with retrieving the MNO information based on the user digital identifier and performing the MNO check without a user instruction or user input to provide personal or account information, thereby simplifying/expediting the authentication process.

If the MNO check fails, system 100 may notify the user and request additional authentication information from the user at step 3. As illustrated in user interface 1110, system 100 may inform the user what additional authentication information is needed and how system 100 may use such authentication information. System 100 may provide an option to allow the user to proceed further by submitting acceptable authentication information by pressing icon 1120 on user interface 1110. System 100 may provide an option to allow the user to inquire as to why the user needs to verify with additional authentication information by pressing icon 1130 on user interface 1110. System 100 may also provide an option to allow the user to abort the user request. In some embodiments, the user request may abort in the absence of a user interaction within a time limit (e.g., 1 minute, 3 minutes, etc.). In some embodiments, system 100 may generate a prompt for display on user interface 1110 to ask the user to indicate whether to abort the user request.

Figure 12:
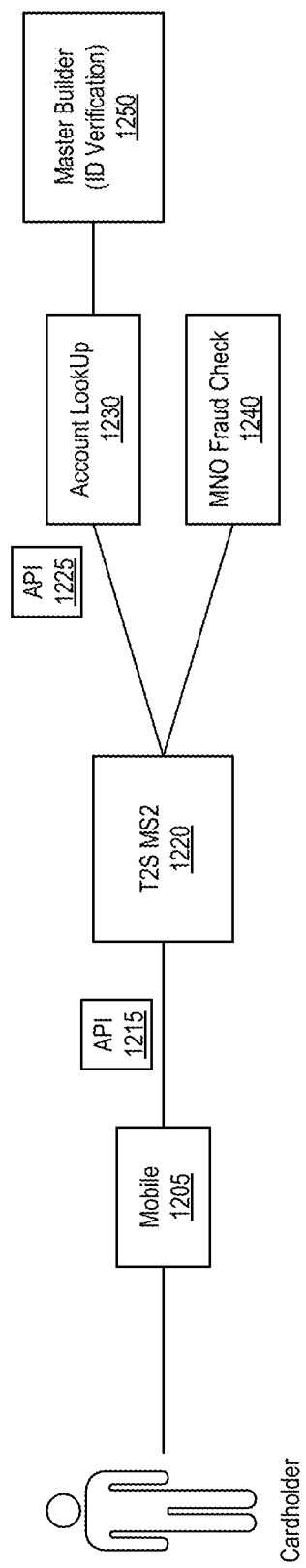

FIG. 12 shows a flowchart for steps 2 and 3 of FIG. 11 in accordance with one or more embodiments of the present disclosure. Following step 1 as illustrated in FIG. 11, the user (also referred to as cardholder) may click, on the mobile device 1205, the link received from digital messaging subsystem 504, which calls the mobile interface. T2S MS2 1220 may be part of Text-to-Spend Micro Services 506. The mobile device 1205 may call, via API 1215, T2S MS2 1220 to provide the user digital identifier (e.g., a mobile phone number) to T2S MS2 1220. T2S MS2 1220 may call, via API 1225, Account Lookup API 1230 to find a matching account number (e.g., the account number of an account associated with the third party that the user intends to perform a transaction with via the user account). If the account is found (one account or one VCN), T2S MS2 1220 may call MNO Fraud Check API 1240 for fraud validation. If the MNO fraud check is unsatisfactory, system 100 may request that the user provide, via the mobile device, additional authentication information, e.g., a government ID or a social security number, for authentication via Master Builder 1250.

At step 4 of FIG. 11, in response to receipt of additional authentication information, system 100 may make an assessment to determine whether to authenticate the user request. The additional authentication information may include an alternate phone number, a Social Security number, a birthday, an electronic copy of a driver's license, or the like, or a combination thereof. The additional authentication information may be provided in the form of text, an audio file, an image, a video, or the like, or a combination thereof. Merely by way of example, the user may submit, using the mobile phone, an image of his/her driver's license, and system 100 may process the image and make an assessment based on the image. As another example, the user may submit, using the mobile phone, an audio file including his/her personal information including birthday and Social Security number, and system 100 may process the audio file by voice recognition, retrieve the birthday and Social Security number from the audio file, and make an assessment based on the retrieved information. System 100 may also, with user permission, extract a voiceprint (e.g., in the form of a feature vector characterizing the voice recorded in the audio file), and use the extracted voiceprint in the assessment.

Figure 13:
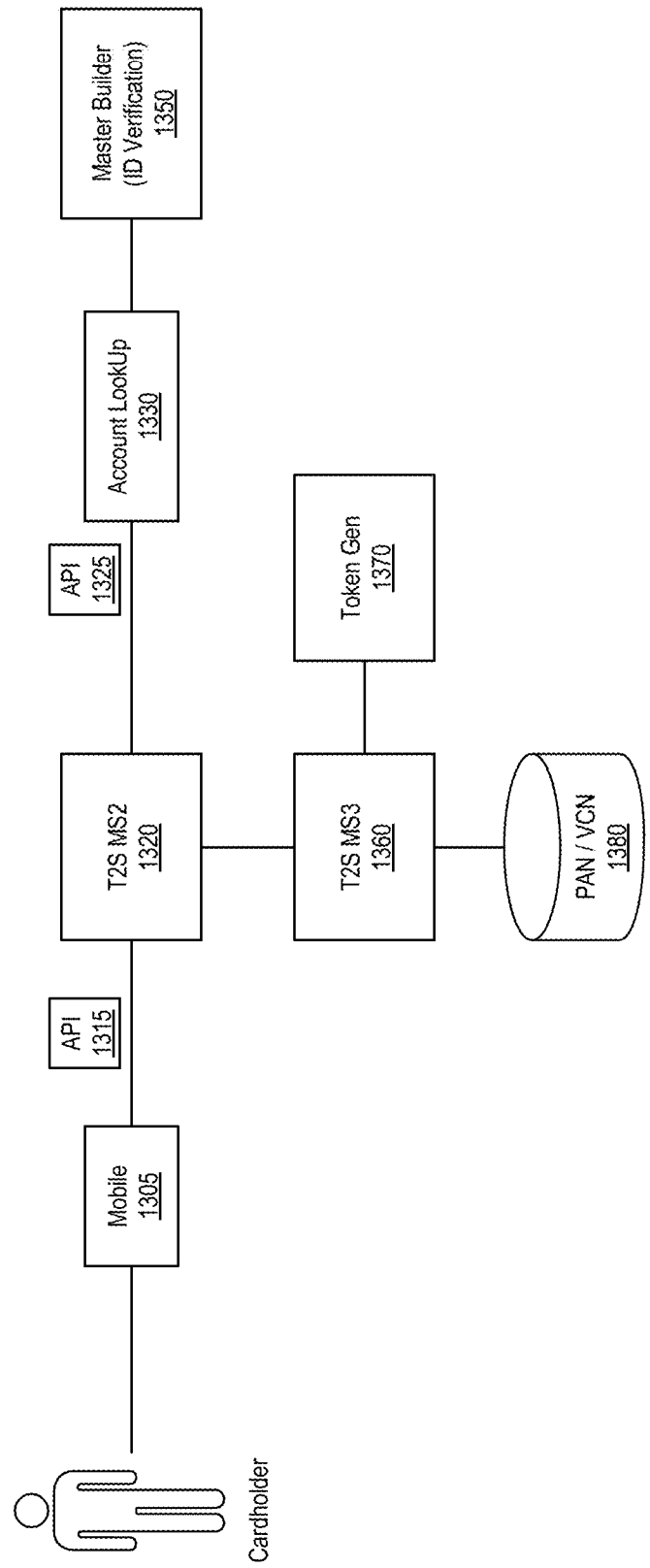

FIG. 13 shows a flowchart for step 4 of FIG. 11 in accordance with one or more embodiments of the present disclosure. In response to a request for additional authentication information, the user may submit an image of his/her driver's license via the mobile device 1305 and call T2S MS2 1320 via API 1315 with the driver's license image (or the user digital identifier (e.g., phone number) in addition). In response to receipt of the additional authentication information, T2S MS2 1320 may call, via API 1325, Account Lookup API 1330 with the additional authentication information including one or more of the phone number and an image of the driver's license to search for a matching user account. If the user account is found (one account or one VCN), T2S MS2 1320 may call Master Builder 1350 to assess the additional authentication information of the user; if a result of the assessment is satisfactory, T2S MS2 1320 may call T2S MS3 1360 to generate and store token information. T2S MS3 1360 may call Token Generator 1370 to create a QR code. T2S MS3 1360 may store the PAN/VCN corresponding to the QR code in Datastore 1380 and return the generated QR code to T2S MS2 1320. T2S MS2 1320 may return the QR code to the mobile device 1305, which in turn may display the QR code to the user.

Step 5 of FIG. 11 may be the same as step 3 of FIG. 7 and the flowchart of FIG. 10, the description of which is not repeated here.

Figure 14:
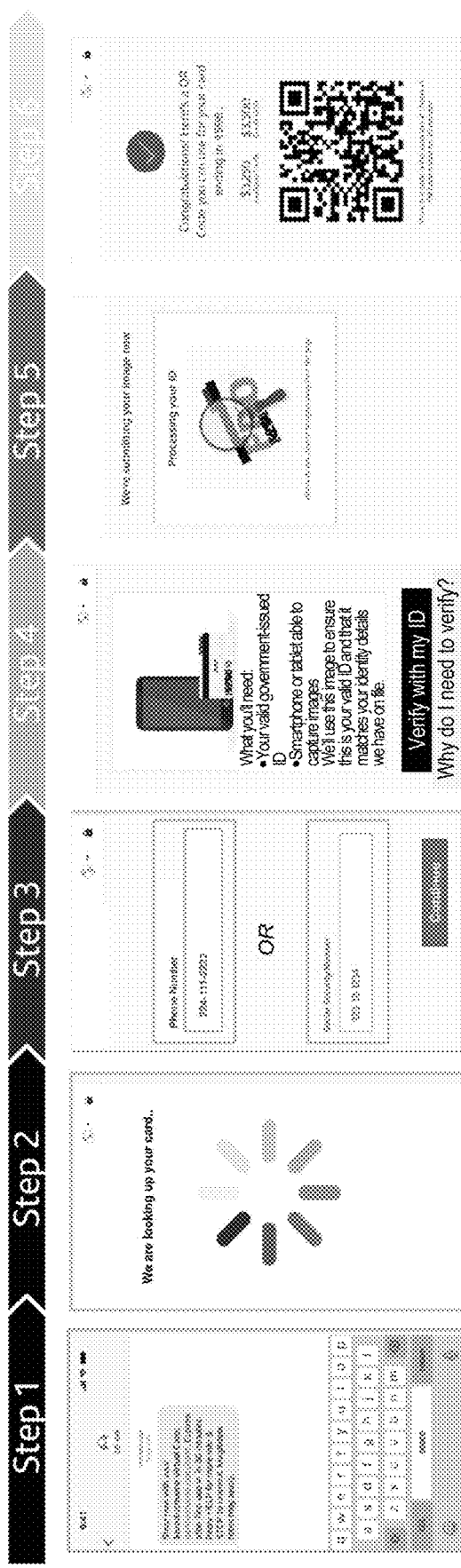
Figure 15:
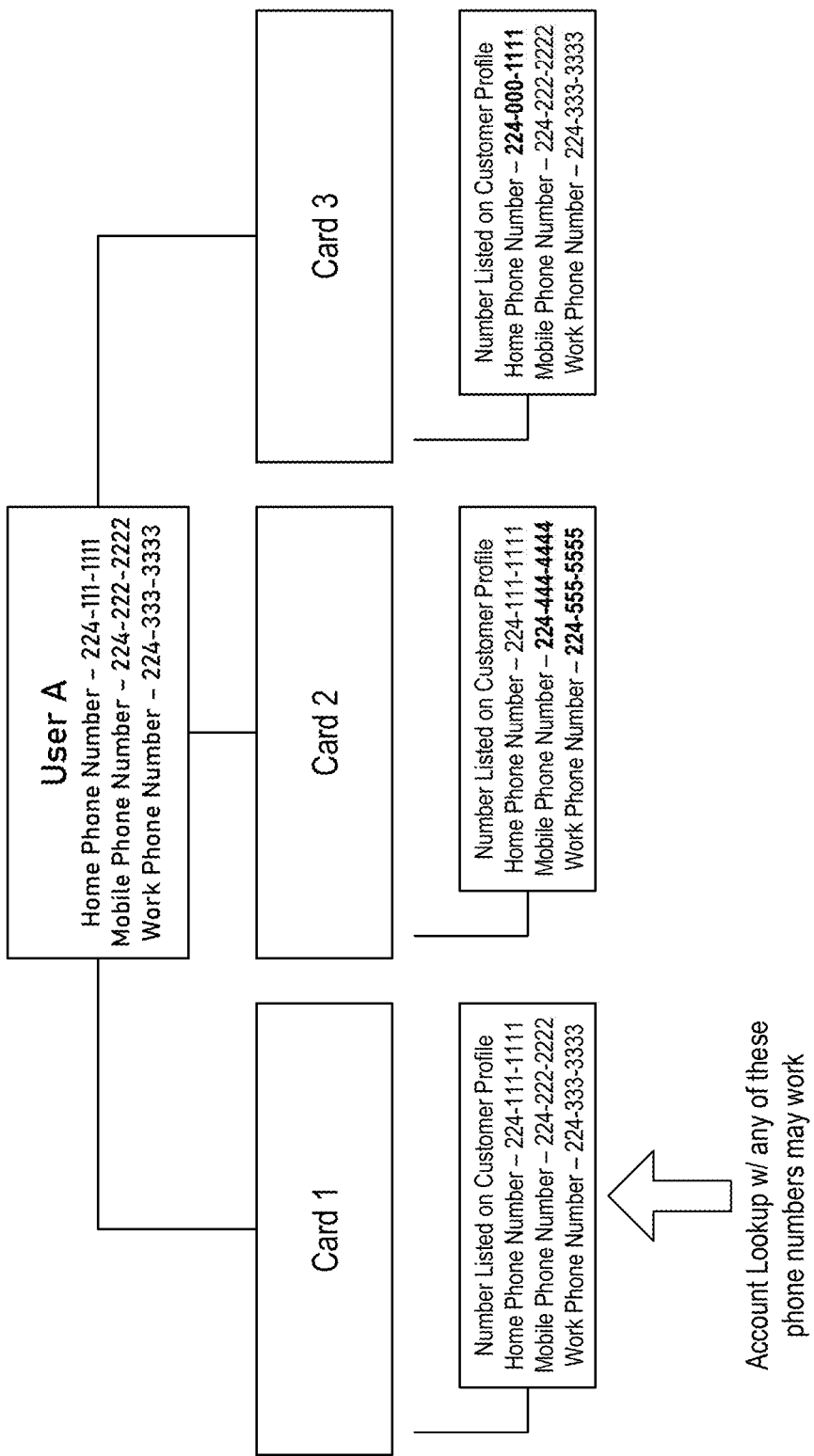

FIG. 14 illustrates user interface pages of a use case in which a user account is not found based on a user digital identifier of a mobile device through which the user submits a user request for authentication in absence of a physical authentication token, in accordance with one or more embodiments. Step 1 of FIG. 11 may be the same as step 1 of FIG. 7 and the flowchart of FIG. 8, the description of which is not repeated here. At step 2, system 100 may perform an account lookup based on the user digital identifier. System 100 may initiate the account lookup based on the user digital identifier, in response to receiving an indication of the user accessing the link to the webpage from the mobile device, before the user provides personal or account information, thereby simplifying/expediting the account lookup process. If system 100 cannot find a user account based on the user digital identifier, system 100 may ask the user to provide alternative information for account lookup. For example, as illustrated at step 3, system 100 may provide an option for the user to provide an alternative phone number (that is different from the user digital identifier) or a Social Security number for the further account lookup. As illustrated in FIG. 15, a user (e.g., customer A) may have multiple digital identifiers (e.g., phone numbers, email addresses, etc.), and have multiple payment cards. Different digital identifiers may be registered or otherwise associated with different payment cards of customer A. An account lookup may identify one of the payment cards with any one of the digital identifiers associated with the individual payment card. If a user account is identified using the alternative information other than the user digital identifier, system 100 may proceed with the authentication process. However, because the MNO information does not correspond to the user account and, accordingly, system 100 is unable to take full advantage of the MNO information and the MNO fraud check, system 100 may proceed with the authentication process based on additional authentication information.

Steps 4 through 6 of FIG. 14 may be substantially the same as or similar to steps 3 through 5 of FIG. 11 and also the flowcharts in FIGS. 12 and 13, the description of which is not repeated.

Figure 16:
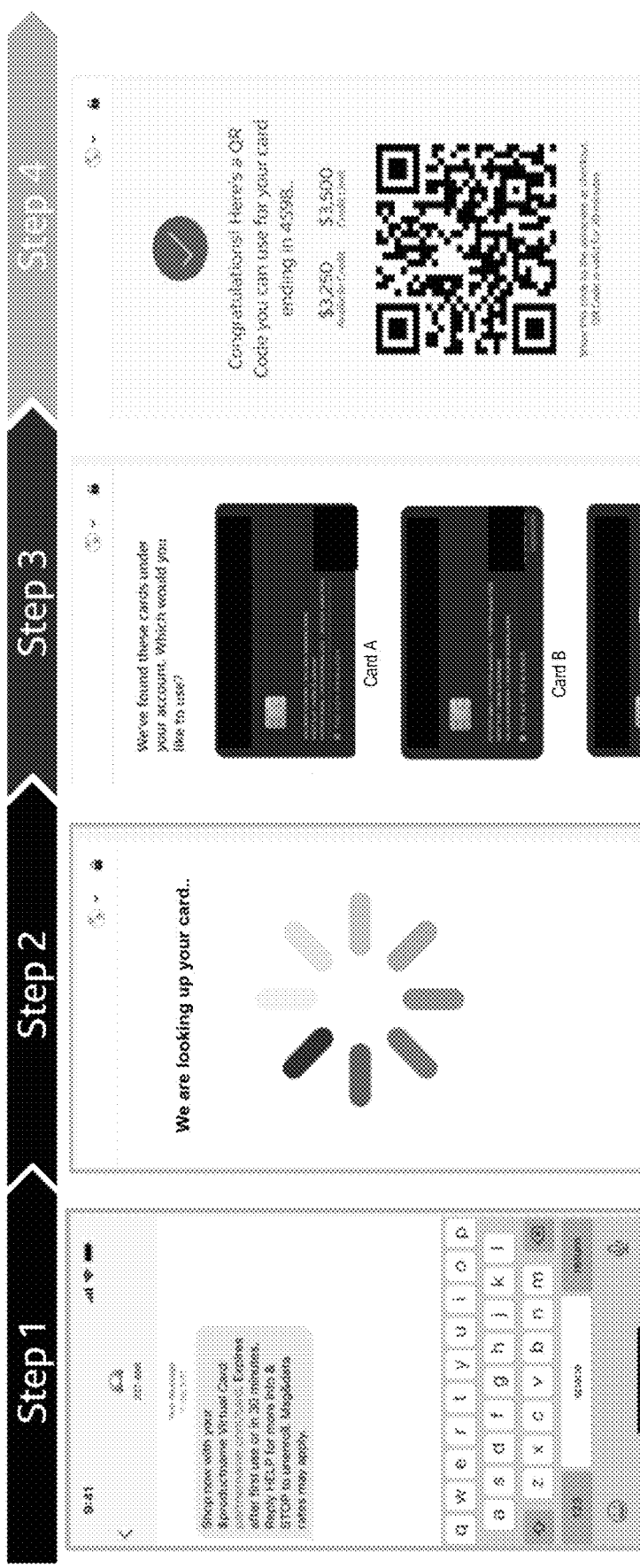

FIG. 16 illustrates user interface pages of a use case in which a user request for authentication in absence of a physical authentication token passes based on an MNO check and multiple user accounts are identified during the account lookup, in accordance with one or more embodiments. Steps 1, 2, and 4 of FIG. 16 may be the same as steps 1 through 3 of FIG. 7 and the flowchart of FIGS. 8 through 10, the description of which is not repeated here. At step 3, system 100 may find multiple user accounts by account lookup based on the user digital identifier. System 100 may invite the user to select which user account to proceed with. In response to the user selection, system 100 may generate and transmit a machine-readable code to the mobile device for the user to use in a transaction with a third party.

Figure 17:
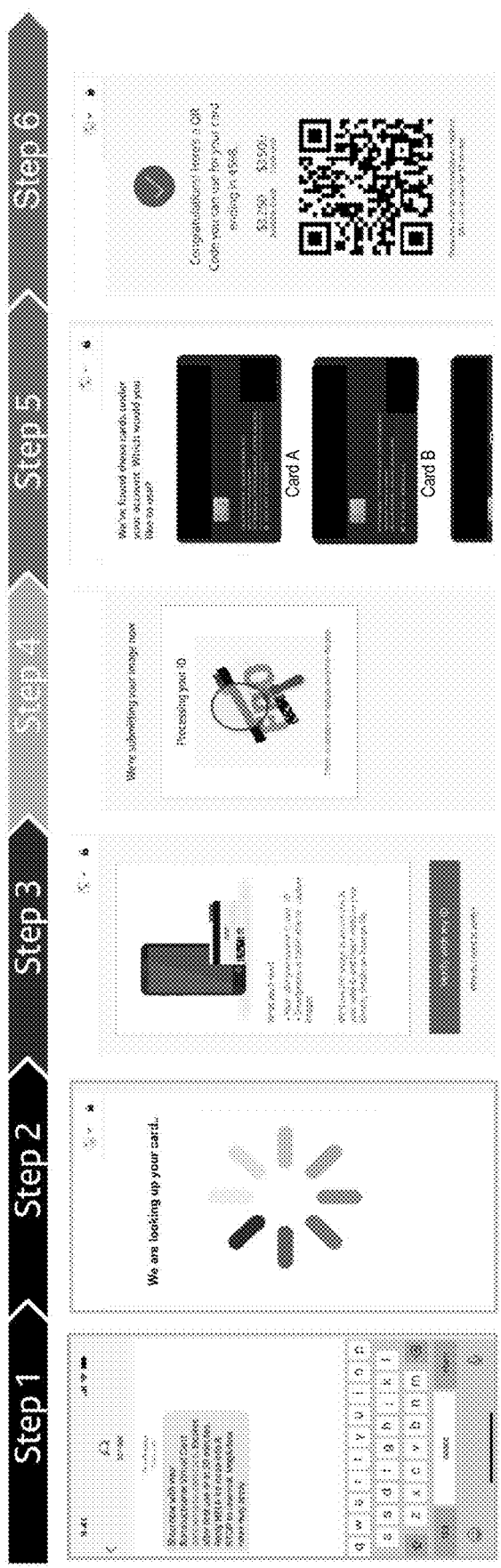

FIG. 17 illustrates user interface pages of a use case in which a user request for authentication in absence of a physical authentication token fails based on an MNO check with respect to the user digital identifier of a mobile device through which the user submits the user request and multiple user accounts are identified by account lookup based on alternative information (other than the user digital identifier of the mobile device), in accordance with one or more embodiments. Steps 1 through 4 and step 6 of FIG. 17 may be the same as steps 1 through 5 of FIG. 11 and the flowchart of FIGS. 12 and 13, the description of which is not repeated here. At step 5 of FIG. 17, system 100 may find multiple user accounts by account lookup based on the user digital identifier. System 100 may invite the user to select which user account to proceed with. In response to the user selection, system 100 may generate and transmit a machine-readable code to the mobile device for the user to use in a transaction with a third party.

Figure 18:
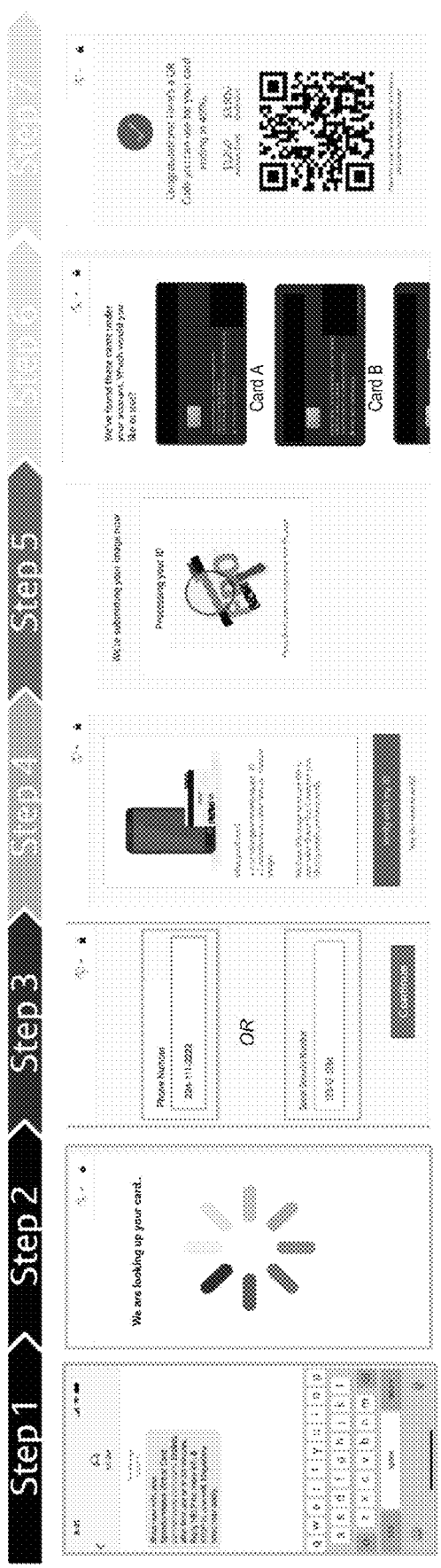

FIG. 18 illustrates user interface pages of a use case in which a user account is not found based on a user digital identifier of a mobile device through which the user submits a user request for authentication in absence of a physical authentication token, and multiple user accounts are identified by account lookup based on alternative information (other than the user digital identifier of the mobile device), in accordance with one or more embodiments. Steps 1 through 5 and 7 of FIG. 18 may be the same as steps 1 through 6 of FIG. 14, the description of which is not repeated here. At step 6 of FIG. 18, system 100 may find multiple user accounts by account lookup based on the alternative information of the user other than the user digital identifier. System 100 may invite the user to select which user account to proceed with. In response to the user selection, system 100 may generate and transmit a machine-readable code to the mobile device for the user to use in a transaction with a third party. When a user account is identified using the alternative information other than the user digital identifier, because the MNO information does not correspond to the user accounts identified and, accordingly, system 100 is unable to take full advantage of the MNO information and the MNO fraud check, system 100 may proceed with the authentication process based on additional authentication information.

As illustrated in various embodiments of the present disclosure including, e.g., FIGS. 7-18, system 100 may proceed with some operations of the authentication process before or without the user inputting any user information, thereby expediting and/or simplifying the authentication process. For example, system 100 may initiate an account lookup in response to receiving an indication of the user accessing the link to the webpage from the mobile device, before or without the user providing personal or account information, thereby simplifying/expediting the account lookup process and the overall authentication process. As another example, in response to receiving an indication of the user accessing the link to the webpage from the mobile device (indicating a user intention to proceed with the authentication process) and/or locating the user account associated with the third party, system 100 may proceed with retrieving the MNO information based on the user digital identifier and performing the MNO check without a user instruction or user input to provide personal or account information, thereby simplifying/expediting the authentication process. In some circumstances, system 100 may authenticate the user request based on a satisfactory MNO check, obviating the need for the user to provide any personal or account information, thereby further simplifying/expediting the authentication process. As a further example, even when the MNO check fails, the user may submit acceptable personal or account information directly to system 100. Accordingly, regardless of whether the MNO check is successful, the user may interact with system 100 directly without involving the third party in the authentication process, where the third party becomes involved after system 100 authenticates the user request and provides a machine-readable code that the user can use in a subsequent transaction with the third party, thereby improving the efficiency of the authentication process, reducing the risks associated with involving third party as described elsewhere in the present disclosure, obviating or simplifying the interactions (including, e.g., interaction for user account authentication in absence of a physical authentication token as described herein, system setup, maintenance, and/or upgrade associated with such authentication processes, etc.) between system 100 and the third party (and multiple third parties that are similarly situated), and/or alleviating the technical challenges and burden on the third party associated with such user account authentication in absence of a physical authentication token as described herein.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for text messaging-based self-service authentication in absence of a physical authentication token.
2. The method of any one or more embodiments herein, including receiving, from a mobile device, a first text message addressed to a recipient digital identifier, wherein the mobile device is operating on a mobile network and associated with a user digital identifier relating to the mobile network, and wherein the first text message indicates a request for account access in absence of the physical authentication token; generating, for transmission to the mobile device, a second text message including a link to a webpage for account access in absence of the physical authentication token; in response to receiving an indication of accessing the link from the mobile device, determining, based on the user digital identifier, whether there exists a user account associated with the user digital identifier; in response to determining an existence of the user account, determining, based on mobile device information, whether to authenticate the request, wherein the mobile device information relates to the mobile network and is associated with the user digital identifier; in response to determining that the request is authenticated, generating a temporary machine-readable code associated with the user account, wherein the temporary machine-readable code is valid for a specified period of time; and transmitting the temporary machine-readable code to the mobile device for display within the webpage on the mobile device, wherein the temporary machine-readable code is configured to allow a third party to access the user account by scanning, within the specified period, the temporary machine-readable code.

3. The method of any one or more embodiments herein, wherein the mobile device information comprises an operation duration during which the mobile device has been operating on the mobile network, an activity history of activities associated with the mobile device, roaming status, a mobile device location when the mobile device transmits the request, or subscriber information.

4. The method of any one or more embodiments herein, wherein determining, based on the mobile device information, whether to authenticate the request comprises: comparing the operation duration with a duration threshold, comparing the mobile device location with a location of the third party, comprising the subscriber information with information of a user associated with the user account, or identifying, based on the mobile device information, whether a fraudulent behavior is associated with the mobile device.

5. The method of any one or more embodiments herein, wherein determining, based on the mobile device information, whether to authenticate the request comprises: extracting, from the mobile device information, a feature vector representing one or more features that are indicative of a risk of fraudulent behavior associated with the mobile device or the user digital identifier; inputting the feature vector into a machine learning model, wherein the machine learning model outputs a characterization of the mobile device information; and determining, based on the characterization of the mobile device information, whether to authenticate the request.

6. The method of any one or more embodiments herein, wherein: the characterization of the mobile device information comprises a risk score; and determining, based on the characterization of the mobile device information, whether to authenticate the request comprises: comparing the risk score with a risk score threshold; and in response to determining that the risk score exceeds the risk score threshold, determining not to authenticate the request based on the mobile device information.

7. The method of any one or more embodiments herein, further comprising: in response to determining not to authenticate the request based on the mobile device information, generating, for transmission to the mobile device, a first notification requesting first additional authentication information.

8. The method of any one or more embodiments herein, further comprising: transmitting the first notification via a third text message to the mobile device, or transmitting the first notification for display in the webpage on the mobile device.

9. The method of any one or more embodiments herein, wherein: the first notification comprises a prompt configured to allow a submission of the first additional authentication information, and the method further comprises: receiving, from the mobile device, the first additional authentication information; determining whether to authenticate the request based on the first additional authentication information; and in response to determining that the request is authenticated based on the first additional authentication information, generating the temporary machine-readable code for transmitting to the mobile device.

10. The method of any one or more embodiments herein, wherein receiving the first additional authentication information comprises: receiving information transmitted using a secure protocol, the information corresponding to the first additional authentication information.

11. The method of any one or more embodiments herein, wherein: the information comprises encrypted data that represent the first additional authentication information or compressed data that represent the first additional authentication information, and the method further comprising obtaining the first additional authentication information by decrypting or decompressing the information.

12. The method of any one or more embodiments herein, further comprising: in response to failing to determine the existence of the user account, generating, for transmission to the mobile device, a second notification requesting second additional authentication information.

13. The method of any one or more embodiments herein, further comprising: transmitting the second notification via a fourth text message to the mobile device or transmitting the second notification for display in the webpage on the mobile device.

14. The method of any one or more embodiments herein, further comprising: in response to receiving the indication of accessing the link from the mobile device, determining, based on the user digital identifier, that multiple user accounts exist; and generating, for transmitting to the mobile device, a third notification inviting a selection from the multiple user accounts to proceed with respect to the request.

15. The method of any one or more embodiments herein, further comprising: in response to receiving the indication of accessing the link from the mobile device, determining, based on the user digital identifier, that multiple user accounts exist; and selecting, from the multiple user accounts, the user account that is associated with the third party.

16. The method of any one or more embodiments herein, wherein: the user account belongs to an account type, and at least one of the account type or the recipient digital identifier is associated with the third party.

17. A method for managing text messaging-based authentication in absence of a physical authentication token.

18. The method of any one or more embodiments herein, comprising: receiving, from a mobile device, a text message indicating a request for access in absence of the physical authentication token, wherein the mobile device is operating on a mobile network and associated with a user digital identifier relating to the mobile network; performing an account search based on the user digital identifier; in response to determining an existence of a user account associated with the user digital identifier, retrieving mobile device information relating to the mobile network and associated with the user digital identifier; performing an assessment based on the mobile device information; selecting, from a plurality of candidate authentication protocols, an authentication protocol based on the assessment of the mobile device information, wherein: according to a first candidate authentication protocol of the plurality of candidate authentication protocols, in response to determining, based on the assessment, that an authentication condition is satisfied, determining that the request is authenticated without requesting further information regarding the user account; and according to a second candidate authentication protocol of the plurality of candidate authentication protocols, in response to determining, based on the assessment, that the authentication condition is not satisfied, requesting additional authentication information regarding the user account; and managing, based on the authentication protocol, the request for access in absence of the physical authentication token.

19. The method of any one or more embodiments herein, further comprising: transmitting, to the mobile device, a second text message including a link to a webpage for access in absence of the physical authentication token; and detecting access of the link from the mobile device before retrieval of the mobile device information.

20. The method of any one or more embodiments herein, wherein according to the second candidate authentication protocol, the method further comprises: generating, for transmission to the mobile device, a first notification requesting the additional authentication information.

21. The method of any one or more embodiments herein, wherein: the first notification comprises a prompt configured to allow a submission of the additional authentication information via a webpage configured to allow access of the user account in absence of the physical authentication token, and the method further comprises: receiving, from the mobile device, the additional authentication information; determining whether to authenticate the request based on the additional authentication information; and in response to determining that the request is authenticated based on the additional authentication information, generating a temporary machine-readable code for transmitting to the mobile device, wherein the temporary machine-readable code is associated with the user account and is valid for a specified period.

22. The method of any one or more embodiments herein, further comprising: receiving information transmitted using a secure protocol, the information corresponding to the additional authentication information.

23. The method of any one or more embodiments herein, wherein: the information comprises encrypted data that represent the additional authentication information or compressed data that represent the additional authentication information, and the method further comprises obtaining the additional authentication information by decrypting or decompressing the information.

24. The method of any one or more embodiments herein, wherein: the additional authentication information comprises text or an image file, and the method further comprises causing the text or the image file to be encrypted or compressed before transmission from the mobile device.

25. The method of any one or more embodiments herein, further comprising: transmitting the first notification via a third text message to the mobile device, or transmitting the first notification for display in a webpage on the mobile device, wherein the webpage is configured to allow access of the user account in absence of the physical authentication token.

26. The method of any one or more embodiments herein, further comprising: in response to failing to determine the existence of the user account, generating, for transmission to the mobile device, a second notification requesting second additional authentication information.

27. The method of any one or more embodiments herein, further comprising: transmitting the second notification via a fourth text message to the mobile device, or transmitting the second notification for display in a webpage on the mobile device, wherein the webpage is configured to allow access of the user account in absence of the physical authentication token.

28. The method of any one or more embodiments herein, wherein the second additional authentication information comprises a second user digital identifier that is different from the user digital identifier associated with the mobile device, the method further comprising: performing a second account search based on the second user digital identifier.

29. The method of any one or more embodiments herein, further comprising: in response to failing to determine the existence of the user account, refraining from retrieving mobile device information relating to the mobile network and associated with the user digital identifier.

30. The method of any one or more embodiments herein, wherein managing the request for access in absence of the physical authentication token comprises: in response to determining that the authentication condition is satisfied, generating a temporary machine-readable code associated with the user account, wherein the temporary machine-readable code is valid for a specified period; and transmitting the temporary machine-readable code to the mobile device for display on the mobile device, wherein the temporary machine-readable code is configured to allow a third party to access the user account by scanning, within the specified period, the temporary machine-readable code.

31. The method of any one or more embodiments herein, further comprising: transmitting the temporary machine-readable code via a fourth text message to the mobile device, or transmitting the temporary machine-readable code for display in a webpage on the mobile device, wherein the webpage is configured to allow access of the user account in absence of the physical authentication token.

32. The method of any one or more embodiments herein, wherein: the user account belongs to an account type associated with the third party, the text message is addressed to a recipient digital identifier, and at least one of the account type or the recipient digital identifier is associated with the third party.

33. A method for machine-readable code-based access in absence of a physical authentication token.

34. The method of any one or more embodiments herein, including: receiving, from a mobile device, a text message indicating a first request for account access in absence of the physical authentication token, wherein the mobile device is operating on a mobile network and associated with a user digital identifier relating to the mobile network; determining whether there exists a user account based on the user digital identifier; in response to determining an existence of the user account based on the user digital identifier, retrieving mobile device information relating to the mobile network and associated with the user digital identifier; determining whether to authenticate the first request based on the mobile device information; in response to determining that the first request is authenticated, generating a first machine-readable code associated with the user account, wherein the first machine-readable code is valid for a specified period; transmitting, to the mobile device, the first machine-readable code for display on the mobile device; receiving a second request from a third party for accessing the user account, wherein the second request was initiated by the third party scanning a second machine-readable code using a third party electronic device; assessing second information associated with the second machine-readable code based on a prediction model and first information associated with the first machine-readable code; in response to determining that the second information corresponds to the first information and the third party scanned the second machine-readable code within the specified period of the first machine-readable code, identifying the user account associated with the first machine-readable code; and authenticating the second request for the third party to access the user account.

35. The method of any one or more embodiments herein, further comprising: in response to determining that the second information fails to correspond to the first information or that the third party scanned the second machine-readable code outside the specified period of the first machine-readable code, determining not to authenticate the second request.

36. The method of any one or more embodiments herein, further comprising at least one of: rejecting the second request; or generating, for transmission to at least one of the mobile device or the third party electronic device, a first notification indicating an authentication failure of the second request.

37. The method of any one or more embodiments herein, wherein the first information comprises at least one of: a temporary account identifier of the user account, an account type of the user account, a limit on a transaction amount, a timestamp that represents a beginning time or an expiration time of the specified period of the first machine-readable code, a location of the mobile device when the text message is sent, the user digital identifier, or the third party that is associated with a recipient digital identifier to which the text message is addressed.

38. The method of any one or more embodiments herein, wherein: the first information associated with the first machine-readable code omits a permanent account identifier of the user account, and the method further comprises identifying the permanent account identifier of the user account to be accessed when the second request for the third party to access the user account is authenticated.

39. The method of any one or more embodiments herein, wherein the second information comprises at least one of: a temporary account identifier of the user account, an account type of the user account, a limit on a transaction amount, a timestamp that represents a beginning time or an expiration time of the specified period of the first machine-readable code, a location of the mobile device when the text message is sent, the user digital identifier, the third party that is associated with a recipient digital identifier to which the text message is addressed, a location of the third party, or a transaction amount associated with the second request.

40. The method of any one or more embodiments herein, further comprising: obtaining the second information transmitted using a secure protocol; and examining integrity of the second information based on the secure protocol before assessing the second information.

41. The method of any one or more embodiments herein, further comprising: in response to determining that the integrity of the second information is compromised, determining not to authenticate the second request; and generating a second notification for transmission to at least one of the mobile device or the third party indicating that the integrity of the second information is compromised.

42. The method of any one or more embodiments herein, wherein assessing the second information associated with the second machine-readable code comprises: extracting, from the first information, a first feature vector representing one or more features of the first request; extracting, from the second information, a second feature vector representing one or more features of the second request; and inputting the first feature vector and the second feature vector into the prediction model, wherein the prediction model outputs a determination whether the second information corresponds to the first information.

43. The method of any one or more embodiments herein, further comprising: transmitting, to the mobile device, a second text message including a link to a webpage for accessing the user account in absence of the physical authentication token; and detecting that the mobile device accesses the webpage via the link before retrieving the mobile device information.

44. The method of any one or more embodiments herein, wherein the link comprises a shortened Uniform Resource Locator (URL) of the webpage.

45. The method of any one or more embodiments herein, further comprising: causing the first machine-readable code to be displayed in a webpage configured to allow access of the user account in absence of the physical authentication token; or transmitting, to the mobile device, a third text message including the first machine-readable code for display on the mobile device.

46. The method of any one or more embodiments herein, further comprising: generating, for transmission to the mobile device, a third notification including transaction information that includes at least one of: a verification that the second request is authenticated for the third party to access the user account, a transaction amount relating to the second request, a transaction type relating to the second request, an identity of the third party, a location of the third party, an account type of the user account, or an issuer of the user account.

47. The method of any one or more embodiments herein, wherein: the third notification further comprises a prompt inviting confirmation or rejection of the transaction information; receiving a user instruction in response to the third notification, the user instruction indicating the confirmation or the rejection of the transaction information; and determining, based on the user instruction, whether to revoke the access to the user account by the third party.

48. The method of any one or more embodiments herein, further comprising: in response to determining that the first machine-readable code has expired, generating, for transmitting to the mobile device, a fourth notification indicating that the first machine-readable code has expired; and voiding the first machine-readable code.

49. A tangible, non-transitory, computer-readable medium storing instructions that, when executed by a data processing apparatus, cause the data processing apparatus to perform operations comprising those of any of embodiments 1-48.

50. A system comprising one or more processors and memory storing instructions that, when executed by the processors, cause the processors to effectuate operations comprising those of any of embodiments 1-48.

51. A system comprising means for performing any of embodiments 1-48.

What is claimed is:

1. A system for machine-readable code-based access in absence of a physical authentication token, comprising:
one or more processors; and
one or more non-transitory, computer-readable media comprising instructions that, when executed by the one or more processors, cause operations comprising:
receiving, from a mobile device, a text message addressed to a recipient digital identifier, wherein:
the mobile device is operating on a mobile network and associated with a user digital identifier relating to the mobile network, and
the text message indicates a first request for access in absence of the physical authentication token;
determining whether there exists a user account based on the user digital identifier;
in response to determining an existence of the user account based on the user digital identifier, retrieving mobile device information relating to the mobile network and associated with the user digital identifier;
determining whether to authenticate the first request based on the mobile device information;
in response to determining that the first request is authenticated, generating a first machine-readable code associated with the user account, wherein the first machine-readable code is valid for a specified period;
transmitting, to the mobile device, the first machine-readable code for display on the mobile device;
receiving a second request from a third party for accessing the user account, wherein the second request was initiated by the third party scanning a second machine-readable code using a third party electronic device;
assessing second information associated with the second machine-readable code based on a prediction model and first information associated with the first machine-readable code;
in response to determining that the second information corresponds to the first information and the third party scanned the second machine-readable code within the specified period of the first machine-readable code, identifying the user account associated with the first machine-readable code; and
authenticating the second request for the third party to access the user account.

2. A method for machine-readable code-based access in absence of a physical authentication token, comprising:
receiving, from a mobile device, a text message indicating a first request for access in absence of the physical authentication token, wherein the mobile device is operating on a mobile network and associated with a user digital identifier relating to the mobile network;
determining whether there exists a user account based on the user digital identifier;
in response to determining an existence of the user account based on the user digital identifier, retrieving mobile device information relating to the mobile network and associated with the user digital identifier;
determining whether to authenticate the first request based on the mobile device information;
in response to determining that the first request is authenticated, generating a first machine-readable code associated with the user account, wherein the first machine-readable code is valid for a specified period;
transmitting, to the mobile device, the first machine-readable code for display on the mobile device;
receiving a second request from a third party for accessing the user account, wherein the second request was initiated by the third party scanning a second machine-readable code using a third party electronic device;
assessing second information associated with the second machine-readable code based on a prediction model and first information associated with the first machine-readable code;
in response to determining that the second information corresponds to the first information and the third party scanned the second machine-readable code within the specified period of the first machine-readable code, identifying the user account associated with the first machine-readable code; and
authenticating the second request for the third party to access the user account.

3. The method of claim 2, further comprising:
in response to determining that the second information fails to correspond to the first information or that the third party scanned the second machine-readable code outside the specified period of the first machine-readable code, determining not to authenticate the second request.

4. The method of claim 3, further comprising at least one of:
rejecting the second request; or
generating, for transmission to at least one of the mobile device or the third party electronic device, a first notification indicating an authentication failure of the second request.

5. The method of claim 2, wherein the first information comprises at least one of: a temporary account identifier of the user account, an account type of the user account, a limit on a transaction amount, a timestamp that represents a beginning time or an expiration time of the specified period of the first machine-readable code, a location of the mobile device when the text message is sent, the user digital identifier, or the third party that is associated with a recipient digital identifier to which the text message is addressed.

6. The method of claim 2, wherein:
the first information associated with the first machine-readable code omits a permanent account identifier of the user account, and
the method further comprises identifying the permanent account identifier of the user account to be accessed when the second request for the third party to access the user account is authenticated.

7. The method of claim 2, wherein the second information comprises at least one of: a temporary account identifier of the user account, an account type of the user account, a limit on a transaction amount, a timestamp that represents a beginning time or an expiration time of the specified period of the first machine-readable code, a location of the mobile device when the text message is sent, the user digital identifier, the third party that is associated with a recipient digital identifier to which the text message is addressed, a location of the third party, or a transaction amount associated with the second request.

8. The method of claim 2, further comprising:
obtaining the second information transmitted using a secure protocol; and
examining integrity of the second information based on the secure protocol before assessing the second information.

9. The method of claim 8, further comprising: in response to determining that the integrity of the second information is compromised,
determining not to authenticate the second request; and
generating a second notification for transmission to at least one of the mobile device or the third party indicating that the integrity of the second information is compromised.

10. The method of claim 2, wherein assessing the second information associated with the second machine-readable code comprises:
extracting, from the first information, a first feature vector representing one or more features of the first request;
extracting, from the second information, a second feature vector representing one or more features of the second request; and
inputting the first feature vector and the second feature vector into the prediction model, wherein the prediction model outputs a determination whether the second information corresponds to the first information.

11. The method of claim 2, further comprising:
transmitting, to the mobile device, a second text message including a link to a webpage for accessing the user account in absence of the physical authentication token; and
detecting that the mobile device accesses the webpage via the link before retrieving the mobile device information.

12. The method of claim 11, wherein the link comprises a shortened Uniform Resource Locator (URL) of the webpage.

13. The method of claim 2, further comprising:
causing the first machine-readable code to be displayed in a webpage configured to allow access of the user account in absence of the physical authentication token; or
transmitting, to the mobile device, a third text message including the first machine-readable code for display on the mobile device.

14. The method of claim 2, further comprising:
generating, for transmission to the mobile device, a third notification including transaction information that includes at least one of:
a verification that the second request is authenticated for the third party to access the user account,
a transaction amount relating to the second request,
a transaction type relating to the second request,
an identity of the third party,
a location of the third party,
an account type of the user account, or
an issuer of the user account.

15. The method of claim 14, wherein:
the third notification further comprises a prompt inviting confirmation or rejection of the transaction information;
receiving a user instruction in response to the third notification, the user instruction indicating the confirmation or the rejection of the transaction information; and determining, based on the user instruction, whether to revoke the access to the user account by the third party.

16. The method of claim 2, further comprising:
in response to determining that the first machine-readable code has expired, generating, for transmitting to the mobile device, a fourth notification indicating that the first machine-readable code has expired; and
voiding the first machine-readable code.

17. One or more non-transitory, computer-readable media for machine-readable code-based access in absence of a physical authentication token comprising instructions that, when executed on one or more processors, cause operations comprising:
receiving, from a mobile device, a first request for access in absence of the physical authentication token, wherein the mobile device is operating on a mobile network and associated with a user digital identifier relating to the mobile network;
determining whether there exists a user account based on the user digital identifier;
in response to determining an existence of the user account based on the user digital identifier, retrieving mobile device information relating to the mobile network and associated with the user digital identifier;
determining whether to authenticate the first request based on the mobile device information;
in response to determining that the first request is authenticated, generating a first machine-readable code associated with the user account, wherein the first machine-readable code is valid for a specified period;
transmitting, to the mobile device, the first machine-readable code for display on the mobile device;
receiving a second request from a third party for accessing the user account, wherein the second request was initiated by the third party scanning a second machine-readable code using a third party electronic device;
assessing second information associated with the second machine-readable code based on a prediction model and first information associated with the first machine-readable code;
in response to determining that the second information corresponds to the first information and the third party scanned the second machine-readable code within the specified period of the first machine-readable code, identifying the user account associated with the first machine-readable code; and
authenticating the second request for the third party to access the user account.

18. The one or more non-transitory, computer-readable media of claim 17, wherein the first request is indicated by the mobile device transmitting a text message to a recipient digital identifier, scanning a third machine-readable code, or accessing a webpage configured to allow access of the user account in absence of the physical authentication token.

19. The one or more non-transitory, computer-readable media of claim 17, wherein the user account belongs to an account type relating to the third party.

20. The one or more non-transitory, computer-readable media of claim 17, wherein the operations further comprise:
in response to determining that the second information fails to correspond to the first information or that the third party scanned the second machine-readable code outside the specified period of the first machine-readable code, determining not to authenticate the second request.

* * * * *